(12) United States Patent
Nakagiri

(10) Patent No.: US 8,711,375 B2
(45) Date of Patent: Apr. 29, 2014

(54) INFORMATION PROCESSING APPARATUS AND METHOD

(75) Inventor: Koji Nakagiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 13/038,709

(22) Filed: Mar. 2, 2011

(65) Prior Publication Data

US 2011/0149328 A1    Jun. 23, 2011

Related U.S. Application Data

(63) Continuation of application No. 10/238,692, filed on Sep. 11, 2002.

(30) Foreign Application Priority Data

Sep. 14, 2001 (JP) .................................. 2001-280605

(51) Int. Cl.
*G06F 3/12* (2006.01)

(52) U.S. Cl.
USPC ....... 358/1.13; 358/1.15; 358/1.16; 358/1.14; 399/81; 715/235

(58) Field of Classification Search
USPC ......... 715/235, 239, 202, 846, 730; 358/1.15, 358/1.13; 710/10
See application file for complete search history.

(56) References Cited

U.S. PATENT DOCUMENTS

| | | | |
|---|---|---|---|
| 5,129,639 A | 7/1992 | DeHority | |
| 5,159,546 A | 10/1992 | Inoue et al. | |
| 5,761,399 A | 6/1998 | Asano | |
| 5,895,476 A * | 4/1999 | Orr et al. | 715/202 |
| 5,909,602 A | 6/1999 | Nakai et al. | |
| 5,918,988 A | 7/1999 | Van Oijen | |
| 5,923,446 A | 7/1999 | Nakagiri | |
| 5,966,503 A | 10/1999 | van Vliembergen et al. | |
| 6,023,714 A * | 2/2000 | Hill et al. | 715/235 |
| 6,031,631 A | 2/2000 | Tahara et al. | |
| 6,065,002 A * | 5/2000 | Knotts et al. | 1/1 |
| 6,128,010 A * | 10/2000 | Baxter et al. | 715/846 |
| 6,134,019 A * | 10/2000 | Wantuck et al. | 358/1.15 |
| 6,149,323 A | 11/2000 | Shima | |
| 6,150,597 A * | 11/2000 | Kakishita et al. | 84/477 R |
| 6,211,875 B1 * | 4/2001 | Lin et al. | 715/782 |
| 6,222,638 B1 | 4/2001 | Otala | |
| 6,240,533 B1 | 5/2001 | Slemmer | |

(Continued)

FOREIGN PATENT DOCUMENTS

| | | |
|---|---|---|
| DE | 69520729 T2 | 9/2001 |
| DE | 69825093 T2 | 11/2004 |

(Continued)

*Primary Examiner* — Ashish K Thomas
(74) *Attorney, Agent, or Firm* — Fitzpatrick, Cella, Harper & Scinto

(57) ABSTRACT

When a document is to be edited and the edited document is to be output to a printing apparatus, a printing apparatus to be used is designated. Either of the first mode in which all predetermined setting items stored in a storage medium in advance are selected, and the second mode in which, of the predetermined setting items, setting items controllable by the designated printing apparatus are selected is set. Setting items to be selected are determined based on the designated printing apparatus and/or set mode. The document is so controlled as to enable editing it on the basis of contents set in the selected setting items.

5 Claims, 31 Drawing Sheets

| | |
|---|---|
| SELECTION PRINTER INFORMATION | ~1801 |
| LIMITED-FUNCTION MODE INFORMATION | ~1802 |
| DOCUMENT STRUCTURE INFORMATION | ~1803 |
| DETAILED DOCUMENT SETTING INFORMATION | ~1804 |
| DETAILED CHAPTER SETTING INFORMATION | ~1805 |
| DETAILED PAGE SETTING INFORMATION | ~1806 |
| ORIGINAL INFORMATION | ~1807 |
| ⋮ | |

(56) References Cited

U.S. PATENT DOCUMENTS

| | | |
|---|---|---|
| 6,278,528 B1 * | 8/2001 | Ohtsuka et al. ............... 358/1.15 |
| 6,301,013 B1 | 10/2001 | Momose et al. |
| 6,301,626 B1 * | 10/2001 | Knox ............................. 710/10 |
| 6,335,795 B1 | 1/2002 | Neuhard et al. |
| 6,384,572 B1 * | 5/2002 | Nishimura .................... 320/106 |
| 6,545,769 B2 * | 4/2003 | Collard et al. ............... 358/1.16 |
| 6,606,465 B2 * | 8/2003 | Mutoh et al. .................... 399/81 |
| 6,667,816 B1 * | 12/2003 | Van Buren et al. .......... 358/3.13 |
| 6,715,129 B1 * | 3/2004 | Hind et al. .................... 715/239 |
| 6,744,868 B2 * | 6/2004 | Mani ......................... 379/201.02 |
| 6,769,606 B1 * | 8/2004 | Blosser et al. ................. 235/379 |
| 6,795,663 B2 * | 9/2004 | Kato ................................ 399/81 |
| 6,847,466 B1 | 1/2005 | Gazdik et al. |
| 6,879,974 B1 * | 4/2005 | Ninomiya et al. .............. 706/62 |
| 6,883,140 B1 * | 4/2005 | Acker et al. ................... 715/730 |
| 6,927,865 B1 | 8/2005 | Kujirai et al. |
| 6,941,523 B1 | 9/2005 | Mathieson |
| 6,952,274 B2 | 10/2005 | Tomitaka |
| 6,967,728 B1 | 11/2005 | Vidyanand |
| 7,027,172 B1 | 4/2006 | Parulski et al. |
| 7,054,021 B2 | 5/2006 | Sesek et al. |
| 7,057,747 B1 | 6/2006 | Minagawa |
| 7,478,320 B2 * | 1/2009 | Nagayama .................... 715/235 |
| 7,609,401 B2 | 10/2009 | Kujirai et al. |
| 2002/0010716 A1 * | 1/2002 | McCartney et al. .......... 707/517 |
| 2003/0081240 A1 | 5/2003 | Soto et al. |
| 2003/0121007 A1 | 6/2003 | Coleman |
| 2004/0141203 A1 | 7/2004 | Honma |

FOREIGN PATENT DOCUMENTS

| | | |
|---|---|---|
| EP | 0529818 A2 | 3/1993 |
| EP | 0720086 B1 | 7/1996 |
| EP | 0861463 A1 | 9/1998 |
| EP | 0867800 B1 | 9/1998 |
| JP | 3185889 | 8/1991 |
| JP | 11147345 A | 6/1996 |
| JP | 8238825 A | 9/1996 |
| JP | 090146731 A | 6/1997 |
| JP | 3191919 A | 8/1998 |
| JP | 10512406 T | 11/1998 |
| JP | 10326167 A | 12/1998 |
| JP | 2000222159 A | 8/2000 |
| JP | 200167347 A | 3/2001 |
| JP | 3653130 B2 | 3/2005 |
| NL | 9402088 A | 7/1996 |
| WO | 9618142 A1 | 6/1996 |
| WO | 01/07997 A1 | 2/2001 |

* cited by examiner

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4 + A3", "B4 + B3", OR "LETTER + LEDGER (11 × 17)" IS DESIGNATED<br>• ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON IS AUTOMATICALLY DESIGNATED WHEN PAPER SIZE IS FIXED SIZE OR N-up PRINTING IS SELECTED. CAN BE SET TO OFF. |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | | |
|---|---|---|---|
| 8 | HEADER / FOOTER | | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DISCHARGE METHOD | STAPLE / PUNCH HOLE | • STAPLING / PUNCHING ONLY IN SINGLE- / DOUBLE-SIDED PRINTING<br>• STAPLING AT ONE / TWO POSITIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON IS AUTOMATICALLY DESIGNATED WHEN PAPER SIZE IS FIXED SIZE OR N-up PRINTING IS SELECTED. CAN BE SET TO OFF. |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DISCHARGE METHOD | STAPLE | • STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY/ NON-DISPLAY | • WHETHER TO DISPLAY ALL WATERMARKS DESIGNATED BY BOOK IS DESIGNATED |
| 3 | HEADER/FOOTER | DISPLAY/ NON-DISPLAY | • WHETHER TO DISPLAY ALL HEADERS/FOOTERS DESIGNATED BY BOOK IS DESIGNATED |
| 4 | ZOOM | 50% - 200% | • ZOOM RATIO RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

FIG. 13

New Document

Printer Name (N): printer 1 ▼

☐ Limit Print Format in Accordance with Function of Selected Printer Model (E)

Function List:
```
Double-Sided Printing / Bookbinding Printing : Available
Maximum Output Paper Size : A3
Staple : Available
Punch Hole : Available
Z-Fold : Available
Saddle Stitch in Bookbinding Printing : Available
```

Format Template (T):

Paper: A3, etc.    Paper Size: B5

A4, Portrait, Single Side

Page Layout: 2 pages /...    Layout Order: Downward from Top

Printing Orientation: Portrait

```
Output Paper Size : A4
Enlarge / Reduce Original in Accordance with Output Paper Size
Printing Orientation : Portrait
Page Layout : 1-Page Printing
Layout Order : None
Boundary : None
Enlarge / Reduce Original in Accordance with Print Region
Position of Original : Center
Printing Method : Single-Sided Printing
```

OK    Cancel    Help (H)

EXAMPLE OF FUNCTION ID LIST (HIGH-END APPARATUS)

(DOUBLE-SIDED PRINTING, OUTPUT PAPER SIZE, STAPLE, PUNCH, Z-FOLD, SADDLE STITCH)

FIG. 14B

EXAMPLE OF FUNCTION ID LIST (LOW-END APPARATUS)

(OUTPUT PAPER SIZE)

FIG. 15A

TEMPLATE 1:

```
OUTPUT PAPER SIZE            =Letter
PAPER ORIENTATION            =PORTRAIT
PAGE LAYOUT                  =2-PAGE PRINTING
PRINTING METHOD              =BOTH SIDES
         BINDING DIRECTION   =LONGITUDINAL BINDING (LEFT)
         BINDING MARGIN      =0mm
         DESIGNATE STAPLE    =ON
         STAPLE POSITION     =UPPER LEFT (ONE POSITION)
         PUNCH HOLE          =NONE
         Z-FOLD              =DESIGNATED
```

FIG. 15B

TEMPLATE 2:

```
OUTPUT PAPER SIZE            =A3
PAPER ORIENTATION            =LANDSCAPE
PAGE LAYOUT                  =1-PAGE PRINTING
PRINTING METHOD              =BOOKBINDING PRINTING
         ADD BOOKBINDING MARGIN   =DESIGNATED
         BOOKBINDING MARGIN       =10mm
         SADDLE STITCH            =DESIGNATED
```

FIG. 17

| Detailed Settings of Document | [?][X] |

| Page Settings | Finishing | Edit | Paper Feed |

Printing Method (Y): ○ Single-Sided Printing
⊙ Double-Sided Printing
○ Bookbinding Printing Binding Direction (B): ☐ Longitudinal Binding (Left) ▼

Binding Width (G): 0 ⇳ mm (0~30)

Adjust Original (J): ⊙ Reduce in Accordance with Print Region
○ Move in Accordance with Binding Width Designate Staple (S): All Pages at Once ▼

Staple Position (L): ☐ Upper Left (One Position) ▼
☑ Punch Hole (N):
☑ Z-fold (Z):

Chaptering (X): None ▼

Restore Defaults

OK | Cancel | Apply (A) | Help

F I G. 19
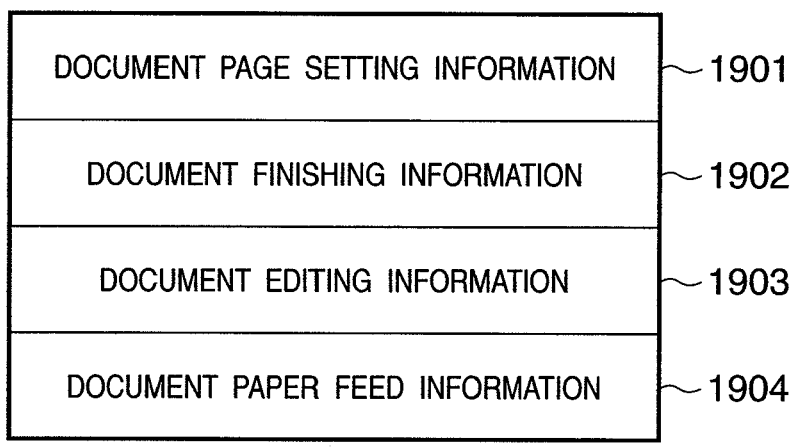

FIG. 20

| | |
|---|---|
| PRINTING METHOD | ~2001 |
| BINDING DIRECTION | ~2002 |
| BINDING WIDTH | ~2003 |
| ORIGINAL ADJUSTMENT | ~2004 |
| STAPLE DESIGNATION | ~2005 |
| STAPLE POSITION | ~2006 |
| PUNCH HOLE | ~2007 |
| Z-HOLD | ~2008 |
| CHAPTERING | ~2009 |
| ⋮ | ~2010 |

F I G. 27
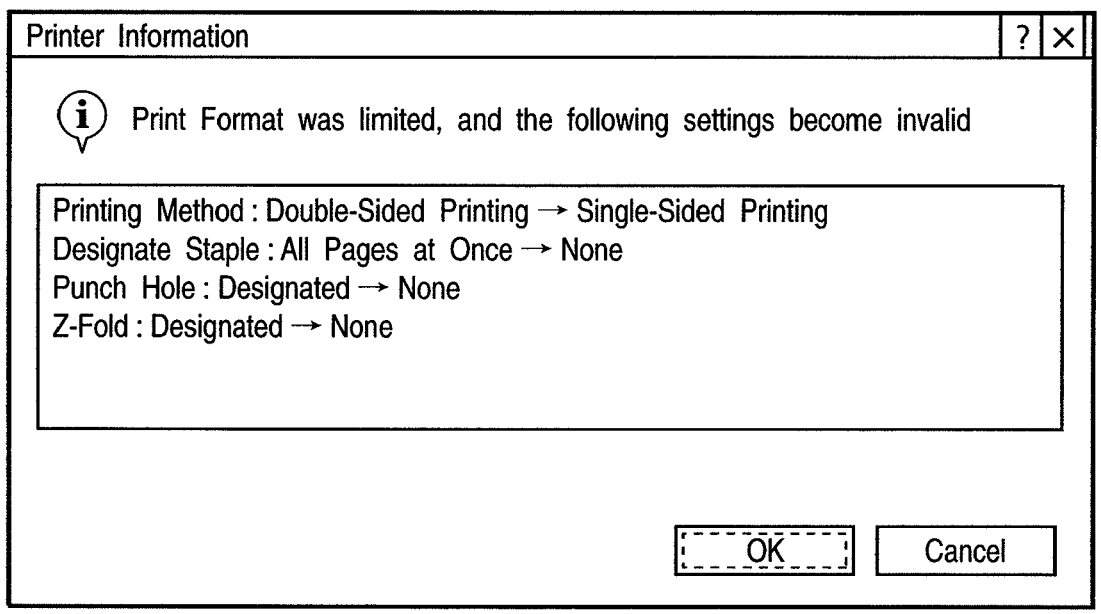

F I G. 30
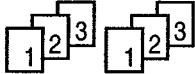

INFORMATION PROCESSING APPARATUS AND METHOD

RELATED APPLICATIONS

This application is a continuation of application Ser. No. 10/238,692, filed on Sep. 11, 2002, claims benefit of that application under 35 U.S.C. §120, and claims benefit under 35 U.S.C. §119 of Japanese Patent Application 2001-280605, filed Sep. 14, 2001; the entire contents of both mentioned prior applications are incorporated herein by reference.

BACKGROUND OF THE INVENTION

1. Field of the Invention

The present invention relates to an information processing apparatus and method for performing various settings of a document to be printed and, more particularly, to an information processing apparatus and method for editing a document and outputting the edited document to a printing apparatus.

2. Description of Related Art

Different types of data such as characters, tables, and images require different structures which define the data and different editing operations for the data. Various application programs are provided in accordance with the type of data. The user uses different applications for different types of data: a character processing program in order to edit characters, a spreadsheet program in order to edit tables, and an image editing program in order to edit images.

In this way, the user generally uses different application programs for different types of data. In general, a document to be created by the user is made up of a plurality of types of data such as characters and tables, or characters and images, rather than a document formed from only one type of data such as characters, tables, or images. To create a target document containing a plurality of types of data, the user must use the printing functions of various applications to print data by the respective applications, and combine the print materials in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

In order to issue a print instruction for a created document or the like on an information processing apparatus such as a personal computer and utilize the functions of a printing apparatus to be used, a control program called a printer driver prepared for every printing apparatus is exploited. The printer driver grasps the functions of the printing apparatus, has a user interface for using the functions, and allows various applications to use the functions. Various applications invoke the user interface of the printer driver in order to utilize the functions of the printing apparatus, and use the printer driver to generate an instruction for using the functions of the printing apparatus.

In general, the application can control some of the functions of the printing apparatus that are recognized by an operating system (to be referred to as an "OS" hereinafter), such as the basic functions of the printing apparatus including the paper size and resolution. However, the application cannot generate an instruction in printing for functions such as staple, punch, and Z-fold functions usable only by the printing apparatus unless the user uses the printer driver.

In the conventional method, the application cannot grasp functions not recognized by the OS. The expected print result of a document created by the application cannot be reflected on the document display, and thus the print result cannot be confirmed on the display in advance.

To solve this problem, systems which assume the use of only limited printing apparatuses and can designate only their functions have conventionally been implemented. Japanese Patent Laid-Open No. 2001-67347 discloses a method of grasping the functions of the printing apparatus in association with the printer driver, generating an instruction for the functions of the printing apparatus, and realizing displaying an expected print result on the display.

However, to assign page numbers to pages when the user creates one target document by combining print materials generated by various applications, he/she must print out all necessary data, combine them into a document, and determine page numbers. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed such that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. The many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of the document file. For example, the user must change format settings at each portion where the format is changed, and print a target page again. This leads to much labor and low productivity, similar to the above-mentioned method.

To use print functions unique to limited printing apparatuses, an instruction generated for a specific printing apparatus is exploited in the conventional method, and cannot be output to another printing apparatus. In the absence of information about a printing apparatus which finally outputs a document, an instruction for outputting a document from this apparatus cannot be generated.

To solve this problem, an instruction generated for a specific printing apparatus is used in printing by another printing apparatus, or in the absence of information about a printing apparatus which finally outputs a document, an instruction for outputting a document from this apparatus is generated. In this case, however, generated instructions may include an impossible instruction.

To facilitate an instruction to the printing apparatus, instructions are selected from a template made up of a combination of instructions, and issued at once. Also in this case, instructions included in a designated template may contain an instruction which cannot be realized by a printing apparatus to be used for printing.

SUMMARY OF THE INVENTION

The present invention has been made in consideration of the above situation, and has as its first object to provide a document processing system and method which enable creating and editing a document made up of data created by user-desired application programs, and increase the operability and document editing productivity.

It is the second object of the present invention to edit a document in accordance with the functions of an arbitrary printing apparatus or without any restrictions on the functions of the printing apparatus regardless of the presence/absence of information about a printing apparatus which finally prints a document.

It is the third object of the present invention to reliably perform proper settings when a document is edited in accordance with the functions of a specific printing apparatus.

It is the fourth object of the present invention to perform proper print settings when a document which is edited in accordance with the functions of an arbitrary printing apparatus or without any restrictions on the functions of the printing apparatus is actually printed by a printing apparatus having different functions.

According to the present invention, the foregoing objects are attained by providing an information processing method performed in an information processing apparatus which communicates with a printing apparatus. The method includes: (1) designating a printing apparatus to be used; (2) setting either a first mode in which, of a plurality of print setting items, both of a print setting item corresponding to function which the designated printing apparatus has and a print setting item corresponding to function which the designated printing apparatus does not have are validated, or a second mode in which, of the plurality of print setting items, the print setting item corresponding to the function which the designated printing apparatus has is validated and the print setting item corresponding to function which the designated printing apparatus does not have is invalidated; and (3) displaying a print setting screen which allows to set a setting value of the validated print setting item corresponding to the function which the designated printing apparatus has and the validated print setting item corresponding to the function which the designated printing apparatus does not have when the first mode is set, and displaying a print setting screen which allows to set a setting value of the validated print setting item corresponding to the function which the designated printing apparatus has and prohibits to set a setting value of the invalidated print setting item corresponding to function which the designated printing apparatus does not have when the second mode is set.

According to the present invention, the foregoing objects are attained by providing an information processing apparatus which communicates with a printing apparatus. The apparatus includes: (1) a designation unit adapted to designate a printing apparatus to be used; (2) a mode setting unit adapted to set either a first mode in which, of a plurality of print setting items, both of a print setting item corresponding to function which the designated printing apparatus has and a print setting item corresponding to function which the designated printing apparatus does not have are validated, or a second mode in which, of the plurality of print setting items, the print setting item corresponding to the function which the designated printing apparatus has is validated and the print setting item corresponding to function which the designated printing apparatus does not have is invalidated; and (3) a setting screen display unit adapted to display a print setting screen which allows to set a setting value of the validated print setting item corresponding to the function which the designated printing apparatus has and the validated print setting item corresponding to the function which the designated printing apparatus does not have when the first mode is set, and a print setting screen which allows to set a setting value of the validated print setting item corresponding to the function which the designated printing apparatus has and prohibits to set a setting value of the invalidated print setting item corresponding to function which the designated printing apparatus does not have when the second mode is set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 4A and 4B show a table of a list of book attributes;

FIG. 5 is a table showing a list of chapter attributes;

FIG. 6 is a table showing a list of page attributes;

FIG. 13 is a view showing an example of a "new document" dialog according to an embodiment of the present invention;

FIGS. 14A and 14B are views showing examples of function information acquired from a printer driver by a book-binding application according to the embodiment of the present invention;

FIGS. 15A and 15B are views for explaining examples of the contents of a template according to the embodiment of the present invention;

FIG. 17 is a view showing a "detailed settings of document" window according to the embodiment of the present invention;

FIG. 19 is a view showing detailed document setting information in a field 1804 of FIG. 18 in more detail according to the embodiment of the present invention;

FIG. 20 is a view showing document finishing information in a field 1902 of FIG. 19 in more detail according to the embodiment of the present invention;

FIG. 27 is a view showing a "printer information" dialog according to the embodiment of the present invention;

FIG. 30 is a view showing a "print" dialog according to the embodiment of the present invention.

DETAILED DESCRIPTION OF THE PREFERRED EMBODIMENT

A preferred embodiment of the present invention will be described in detail in accordance with the accompanying drawings.

<General Description of System>

A document processing system as a preferred embodiment of an information processing system according to the present invention will be generally described with reference to FIGS. 1 to 12. This document processing system converts a data file created by a general application into an electronic original file by an electronic original writer. A bookbinding application provides a function of editing the electronic original file. Details of the system will be explained below.

<System Configuration and Operation>

Figure 1:
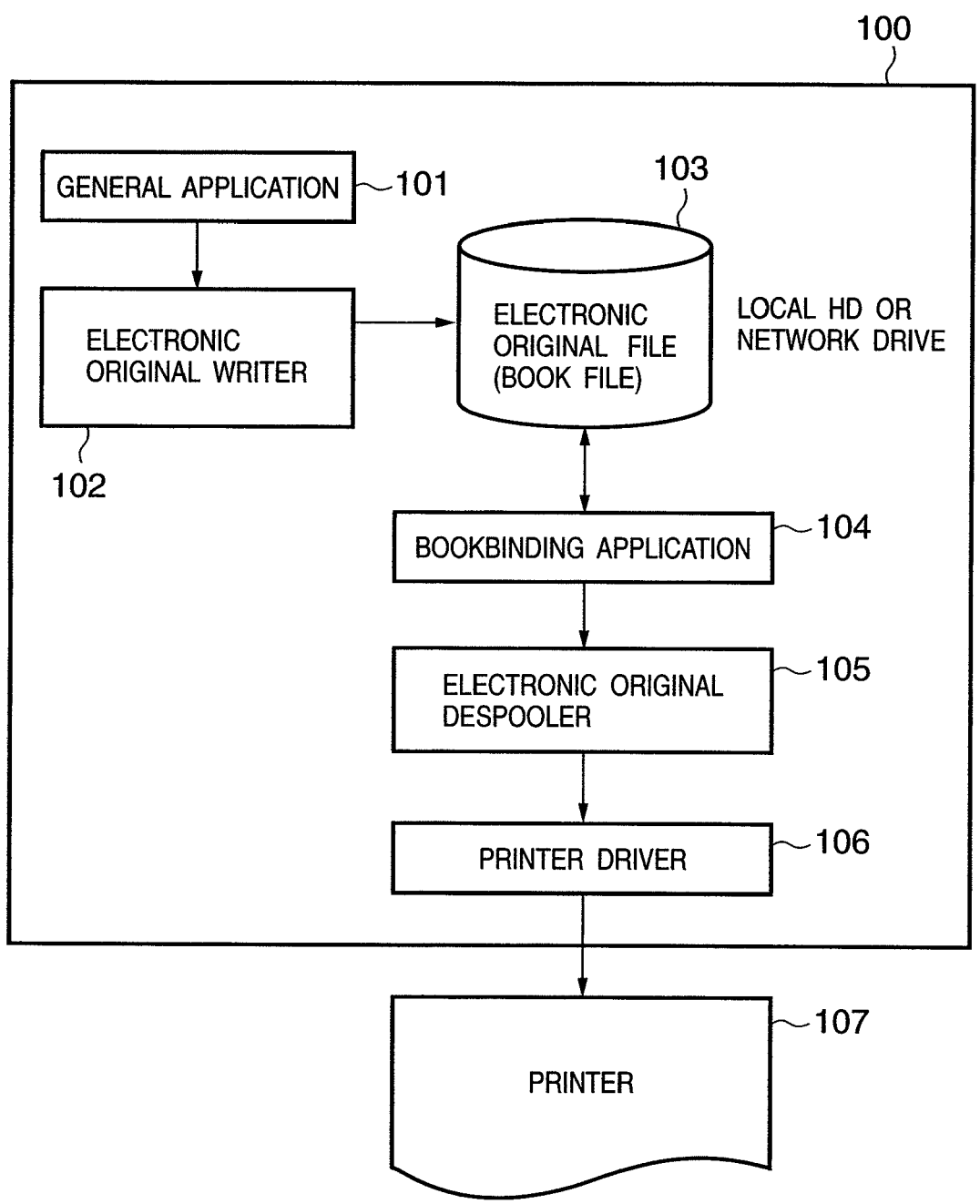
FIG. 1 is a block diagram showing a stand-alone document processing system.

FIG. 1 is a block diagram showing the software structure of the document processing system according to the embodiment. The document processing system is implemented by a digital computer 100 (to be also referred to as a host computer hereinafter) as an embodiment suited to the information processing apparatus of the present invention. A general application 101 is an application program which provides functions such as word processing, spreadsheet, photo-retouch, draw, paint, presentation, and text editing. The general application 101 has a printing function corresponding to the OS. Such applications utilize a predetermined interface (generally called GDI) provided by the OS (Operating System) in printing application data such as created document data or image data. To print created data, the general application 101 transmits an output command (called a GDI function) which is determined in advance for the output module of the OS providing the interface and has an OS-dependent format. The output module which has received the output command converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver, generates print data, and combines print data by JL (Job Language) to generate a print job. When the OS is Microsoft Windows, the output module is a GDI (Graphic Device Interface) module.

An electronic original writer 102 is an improvement of the device driver, and is a software module provided to implement the document processing system. The electronic original writer 102 does not target a specific output device, and converts an output command into a format processible by a bookbinding application 104 or printer driver 106 (to be described later). The format (to be referred to as an electronic original format hereinafter) converted by the electronic original writer 102 is not particularly limited as far as each original page can be expressed by a detailed format. Of substantial standard formats, for example, the PDF format by Adobe Systems and the SVG format can be adopted as electronic original formats. When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application will be called a book file. If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as logical pages or original pages hereinafter) defined by the application 101. The converted data is stored as an electronic original file 103 in a storage medium such as a hard disk. The hard disk may be the local drive of the computer which implements the document processing system of this embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 is a program module installed into the computer together with the bookbinding application 104, and used to output drawing data to a printer driver in printing a document (book file) used by the bookbinding application 104. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 of a printer 107 used as an output device is designated as a device driver. The output module converts the output command received using the printer driver 106 of the designated printer 107 into a device command interpretable by the printer 107. The device command is transmitted to the printer 107, which prints an image corresponding to the command.

Figure 2:
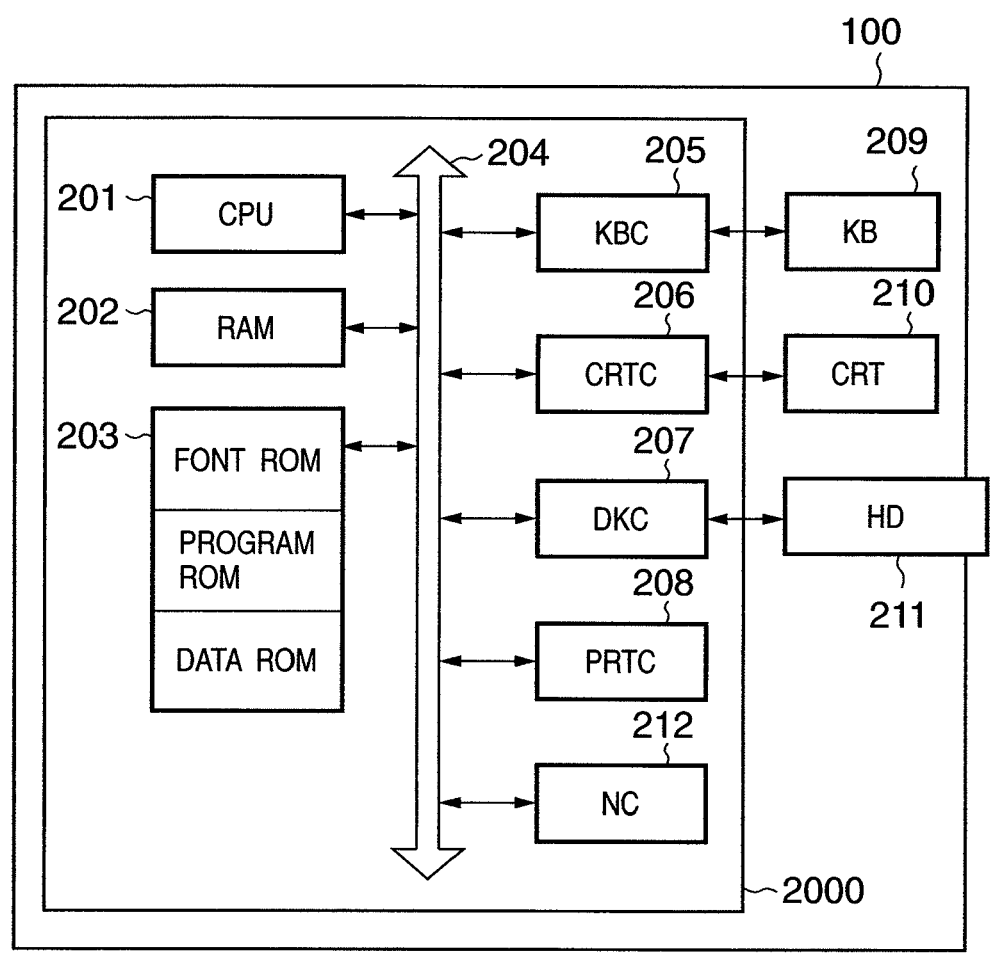
FIG. 2 is a block diagram showing a computer which implements the document processing system.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and realizes the software structure in FIG. 1 or flow chart procedures (to be described later). The CPU 201 also comprehensively controls devices connected to the system bus 204. The font ROM of the ROM 203 or the external memory 211 stores font data and the like used to execute the bookbinding application and the like. The data ROM of the ROM 203 or the external memory 211 stores various data used for document processing and the like. The RAM 202 functions as the main memory and/or work area of the CPU 201. A keyboard controller (KBC) 205 controls a key input from a keyboard 209 or a pointing device (not shown). A CRT controller (CRTC) 206 controls the display on a CRT display 210. A disk controller (DKC) 207 controls access to the hard disk (HD) 211 or floppy disk (FD: not shown) which stores a boot program, various applications, font data, user files, editing files (to be described later), printer control command generation program (to be referred to as a printer driver hereinafter), and the like. A printer controller (PRTC) 208 controls signal exchange with the connected printer 107 (see FIG. 1). A network controller (NC) 212 is connected to a network, and executes communication control processing with another device connected to the network.

The CPU 201 executes, e.g., rasterizing processing of an outline font to a display information RAM set in the RAM 202, realizing WYSIWYG on the CRT 210. The CPU 201 opens various registered windows on the basis of commands designated by a mouse cursor (not shown) or the like on the CRT 210, and executes various data processes. In executing printing, the user opens a window concerning print settings, and can perform setting of a print processing method to a printer driver including setting of a printer and selection of a print mode.

<Electronic Original Data Format>

Before the bookbinding application 104 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of pages.

Figure 3A:
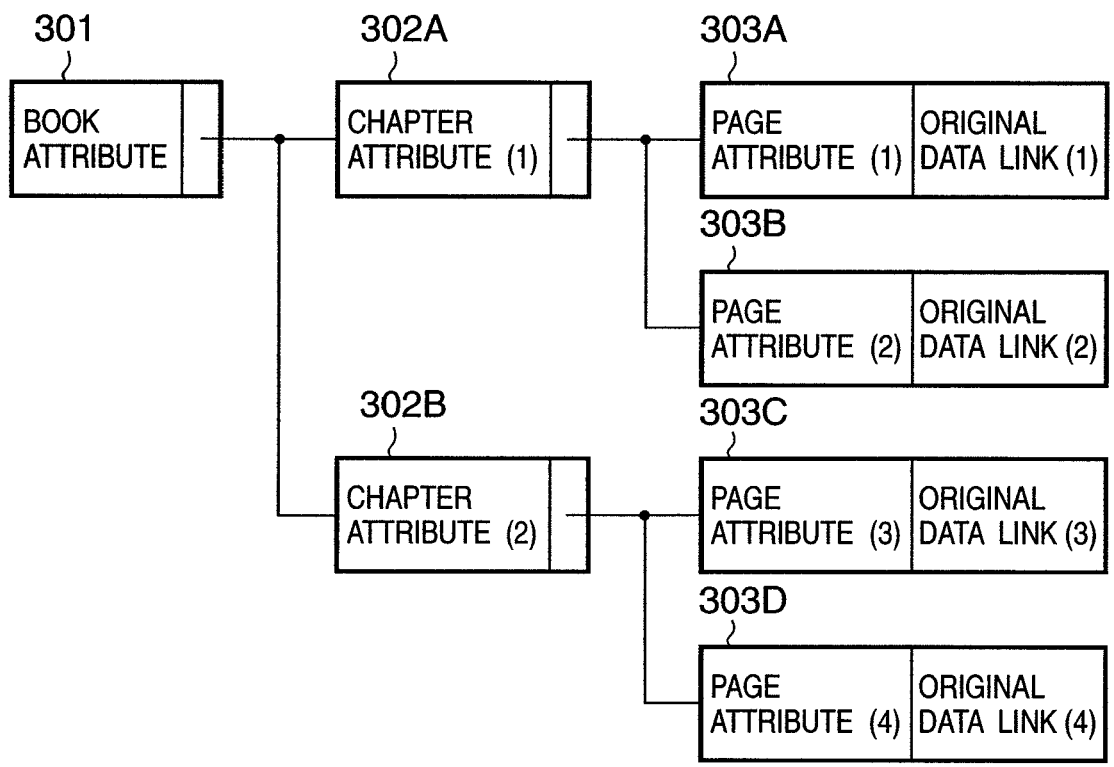
FIGS. 3A and 3B are views showing an example of a book file structure.

FIG. 3A is a block diagram schematically showing an example of the book file format. In the book file of this example, a book, chapter, and page are represented by corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data. In some cases, a print page to be output onto a paper medium or the like includes a plurality of original pages. This structure is displayed not by a link but by an attribute in the book, chapter, or page layer.

Figure 3B:
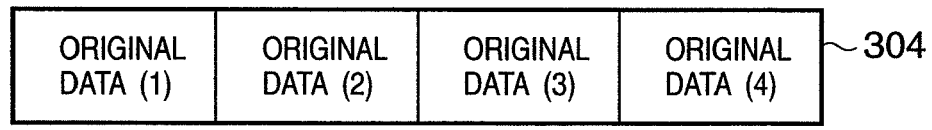

In FIGS. 3A and 3B, a book 301 defines a book attribute, and is linked to two chapters 302A and 302B. These links display that the chapters 302A and 302B are included in the book 301. The chapter 302A is linked to pages 303A and 303B, which represents that the chapter 302A includes these pages. The pages 303A and 303B define attribute values, and contain links to original page data (1) and (2) serving as entities. These links represent data (1) and (2) of original page data 304 shown in FIG. 3B, and display that the entities of the pages 303A and 303B are original page data (1) and (2).

FIG. 4 shows a list of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIG. 4 does not always correspond to one concrete item, but may contain a plurality of relevant items.

FIG. 5 shows a list of chapter attributes, and FIG. 6 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a deckle-edged index sheet separately prepared in a printing apparatus for chaptering, and designation of contents to be printed on the index (deckle-edged) portion. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, two consecutive chapters are not printed on one paper sheet if "the use of a new paper sheet" is designated, but may be printed on the upper and lower surfaces of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1.times.1, 1.times.2, 2.times.2, 3.times.3, 4.times.4, and the like. The discharge method attribute is an item for designating whether to staple discharged paper sheets. The effectiveness of this item depends on whether the printing apparatus has a staple function.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1.times.1, and a region obtained by reducing each side of one print page to about 70% for 1.times.2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a water mark or header/footer throughout the book. To the contrary, the chapter and page can designate whether to print a watermark or header/footer set by the book on the chapter or page.

<Book File Generation Procedures>

Figure 7:
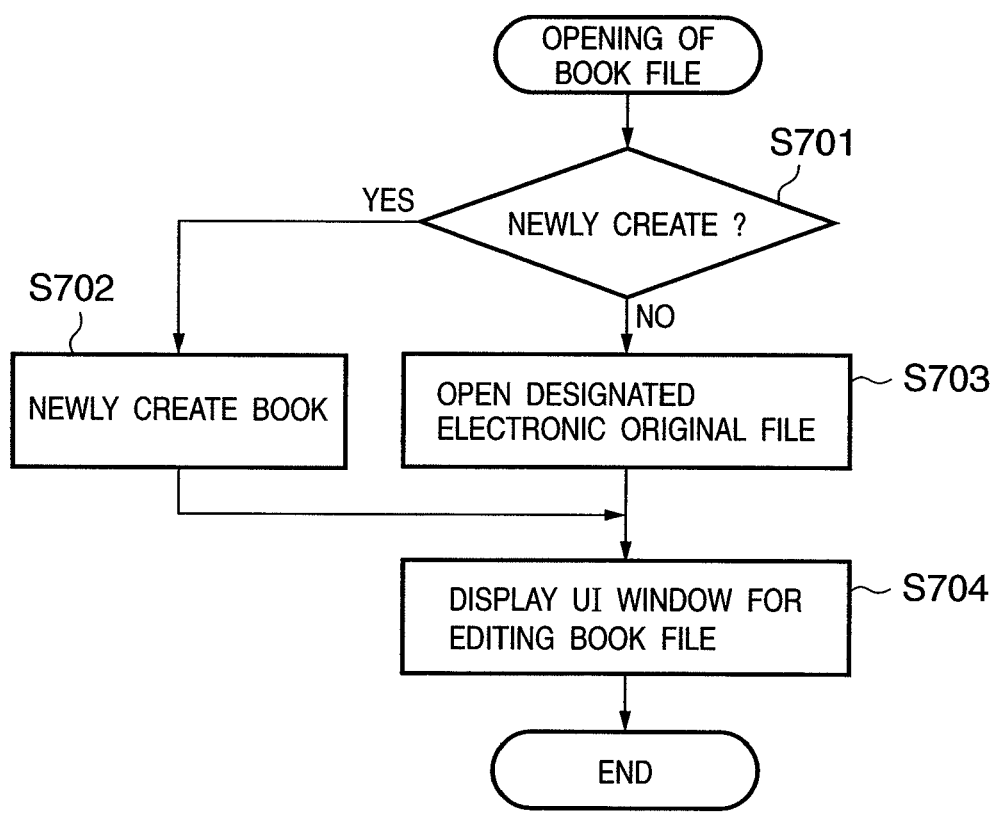
FIG. 7 is a flow chart showing procedures of opening a book file.

The book file has the above-described structure and contents. Procedures of creating a book file by the bookbinding application 104 and electronic original writer 102 will be explained. Creation of a book file is realized as part of book file editing operation by the bookbinding application 104. FIG. 7 shows procedures when the bookbinding application 104 opens a book file.

Figure 11:
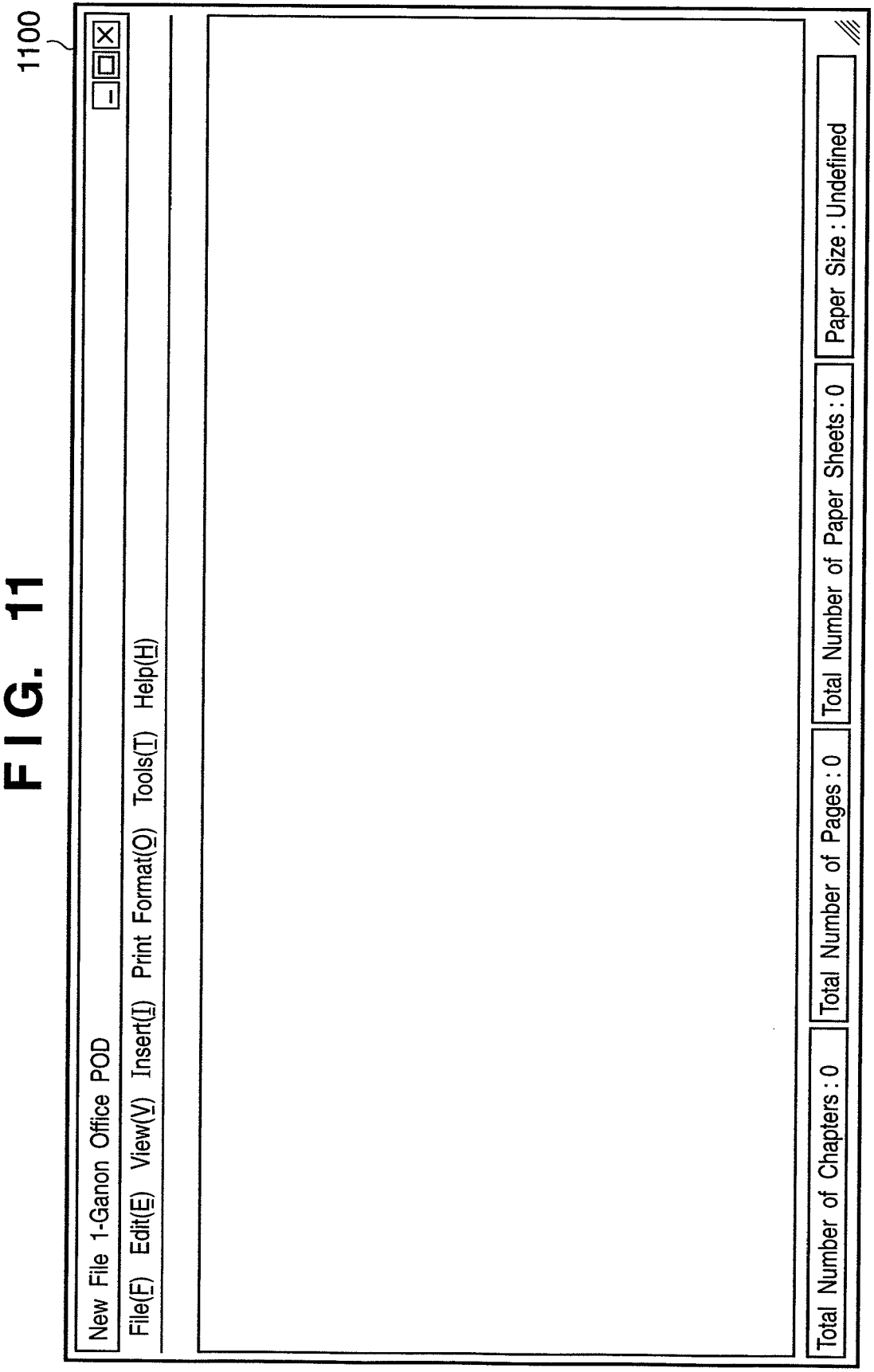
FIG. 11 is a view showing an example of a user interface window when a new book file is opened.

Whether a book file to be opened is one to be newly created or an existing one is checked (step S701). If YES in step S701, a book file including no chapter is newly created (step S702). In the example shown in FIGS. 3A and 3B, the newly created book file is a book node which has only the book node 301 without any link to a chapter node. As the book attribute, a set of attributes prepared in advance for creation of a new book file are applied. Then, a UI (User Interface) window for editing the new book file is displayed (step S704). FIG. 11 shows an example of the UI window when a book file is newly created. In this case, a UI window 1100 does not display any information because the book file does not have any substantial content.

Figure 10:
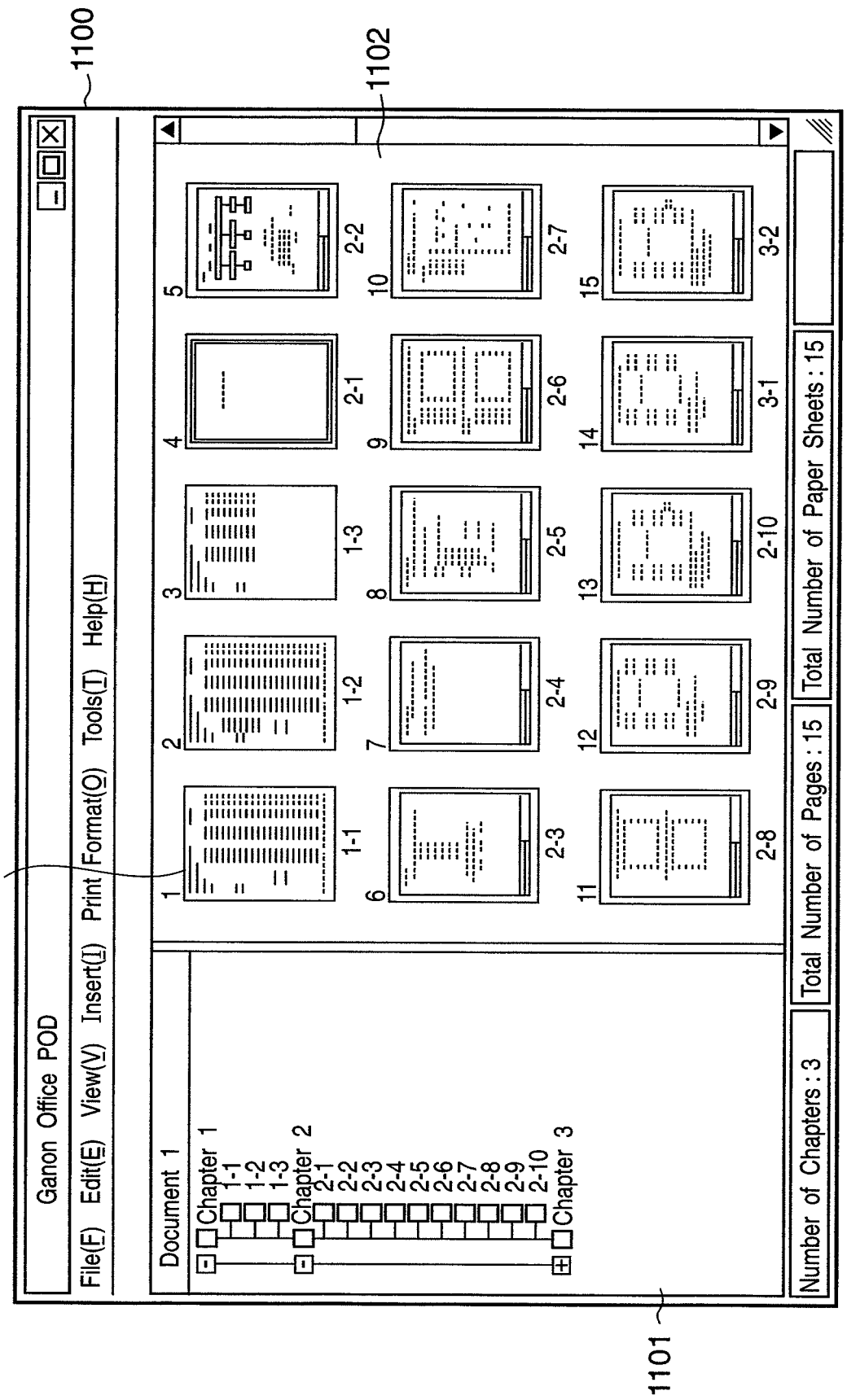
FIG. 10 is a view showing an example of a user interface window when an existing book file is opened.

If NO in step S701, a designated book file is opened (step S703), and a UI (User Interface) window is displayed in accordance with the structure, attribute, and contents of the book file. FIG. 10 shows an example of the UI window. The UI window 1100 has a tree portion 1101 representing a book structure, and a preview portion 1102 displaying a state to be printed. The tree portion 1101 displays chapters included in the book and pages included in each chapter by a tree structure as shown in FIG. 3A. Pages displayed at the tree portion 1101 are original pages. The preview portion 1102 displays reduced print page contents so as to represent a print result based on a selected print function (to be described later). The display order reflects the book structure.

Figure 8:
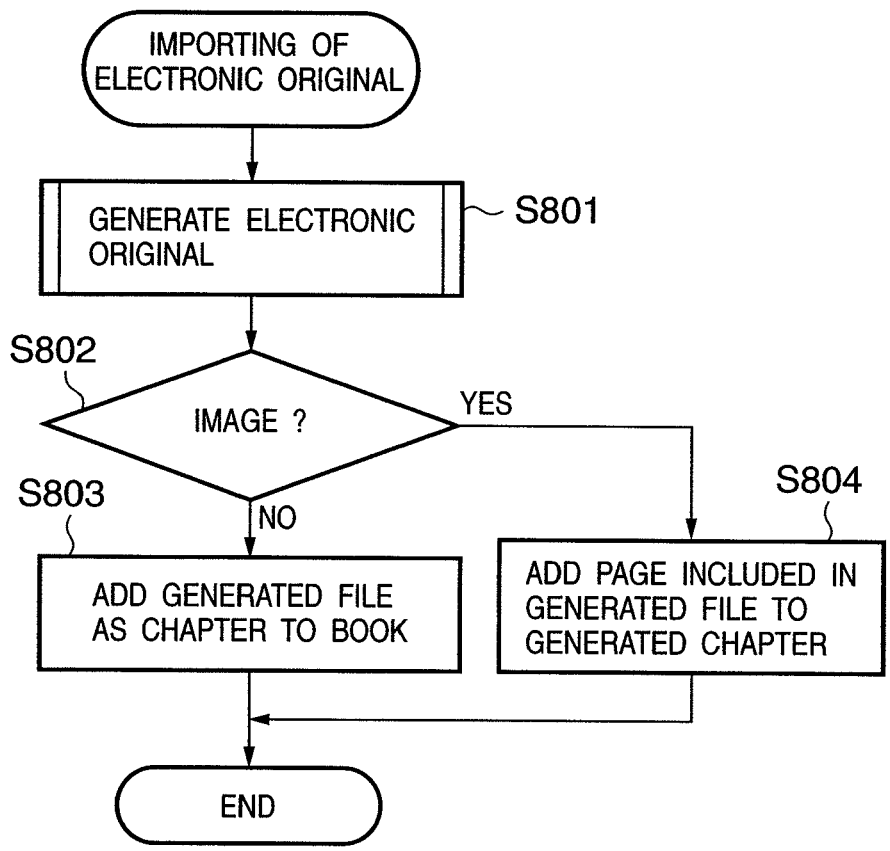
FIG. 8 is a flow chart showing procedures of importing an electronic original file into a book file.

Application data converted into an electronic original file by the electronic original writer 102 can be added as a new chapter to the opened book file. This function is called an electronic original import function. An electronic original is imported to the book file newly created by the procedures of FIG. 7, thereby giving an entity to the book file. This function is activated by drag-and-drop operation of application data to the window of FIG. 10. FIG. 8 shows electronic original import procedures.

An application program which has generated designated application data is activated. The electronic original writer 102 is designated as a device driver, and prints out application data to convert it into electronic original data (step S801). After conversion, whether the converted data is image data is checked (step S802). This determination can be achieved based on the file extension of the application under the Windows OS. For example, an extension "bmp" represents Windows bitmap data; "jpg", jpeg-compressed image data; and "tiff", tiff-format image data. If YES in step S802, processing in step S801 can be skipped because an electronic original file can be directly generated from image data without activating an application in step S801.

If NO in step S802, the electronic original file generated in step S801 is added as a new chapter to the book of a currently open book file (step S803). As for the chapter attribute, an attribute common to a book attribute is set to a book attribute value, and a different attribute is set to a default value prepared in advance.

If YES in step S802, no new chapter is added in principle, and each original page included in the electronic original file generated in step S801 is added to a designated chapter (step S804). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 9:
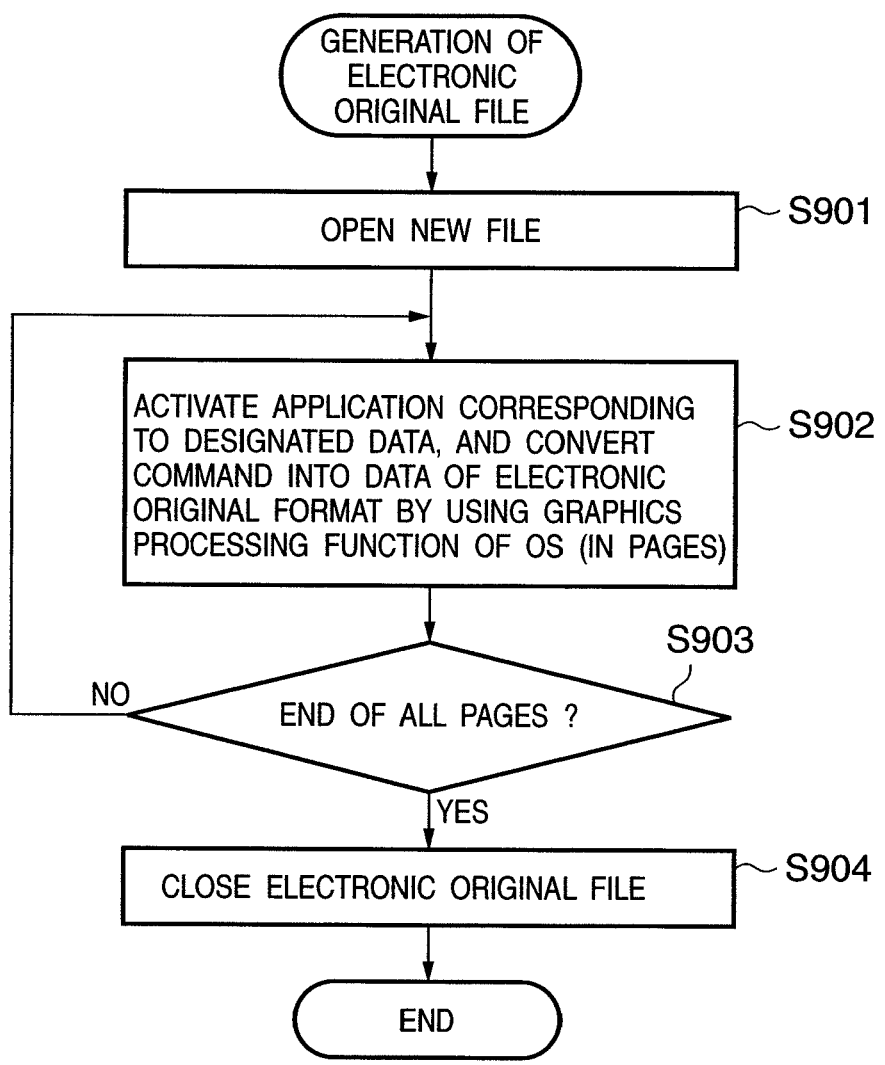
FIG. 9 is a flow chart showing procedures of converting application data into an electronic original file.

FIG. 9 is a flow chart showing procedures of generating an electronic original file by the electronic original writer 102 in step S801 of FIG. 8. A new electronic original file is created and opened (step S901). An application corresponding to designated application data is activated. The electronic original writer is set as a device driver to transmit an output command to the output module of the OS. The output module converts the received output command into data of the electronic original format by the electronic original writer 102, and outputs the converted data (step S902). The output destination is the electronic original file opened in step S901. Whether all designated data have been converted is checked (step S903), and if YES in step S903, the electronic original file is closed (step S904). The electronic original file generated by the electronic original writer 102 is a file containing original page data entities shown in FIG. 3B.

<Editing of Book File>

As described above, a book file can be created from application data. The generated book file allows editing a chapter and page as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4 to 6 and on a book file structure. For example, a blank page is inserted into a designated portion by an operation of newly adding a blank page. The blank page is processed as an original page. If the layout of an original page is changed, the change contents are reflected on attributes such as the printing method, N-up printing, front/backcover, index sheet, slip sheet, and chaptering.

<Output of Book File>

The ultimate goal of a book file created and edited in the above manner is to print it out. The user selects a file menu from the UI window 1100 of the bookbinding application 104 shown in FIG. 10, and selects "print" from this menu. Then, the book file is printed out from a designated output device. At this time, the bookbinding application 104 creates a job ticket from a currently open book file, and transfers the job ticket to the electronic original despooler 105. The electronic original despooler 105 converts the job ticket into an OS output command, e.g., a Windows GDI command, and transmits the command to an output module, e.g., GDI. The output module generates a command complying with a device by a designated printer driver 106, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 12:
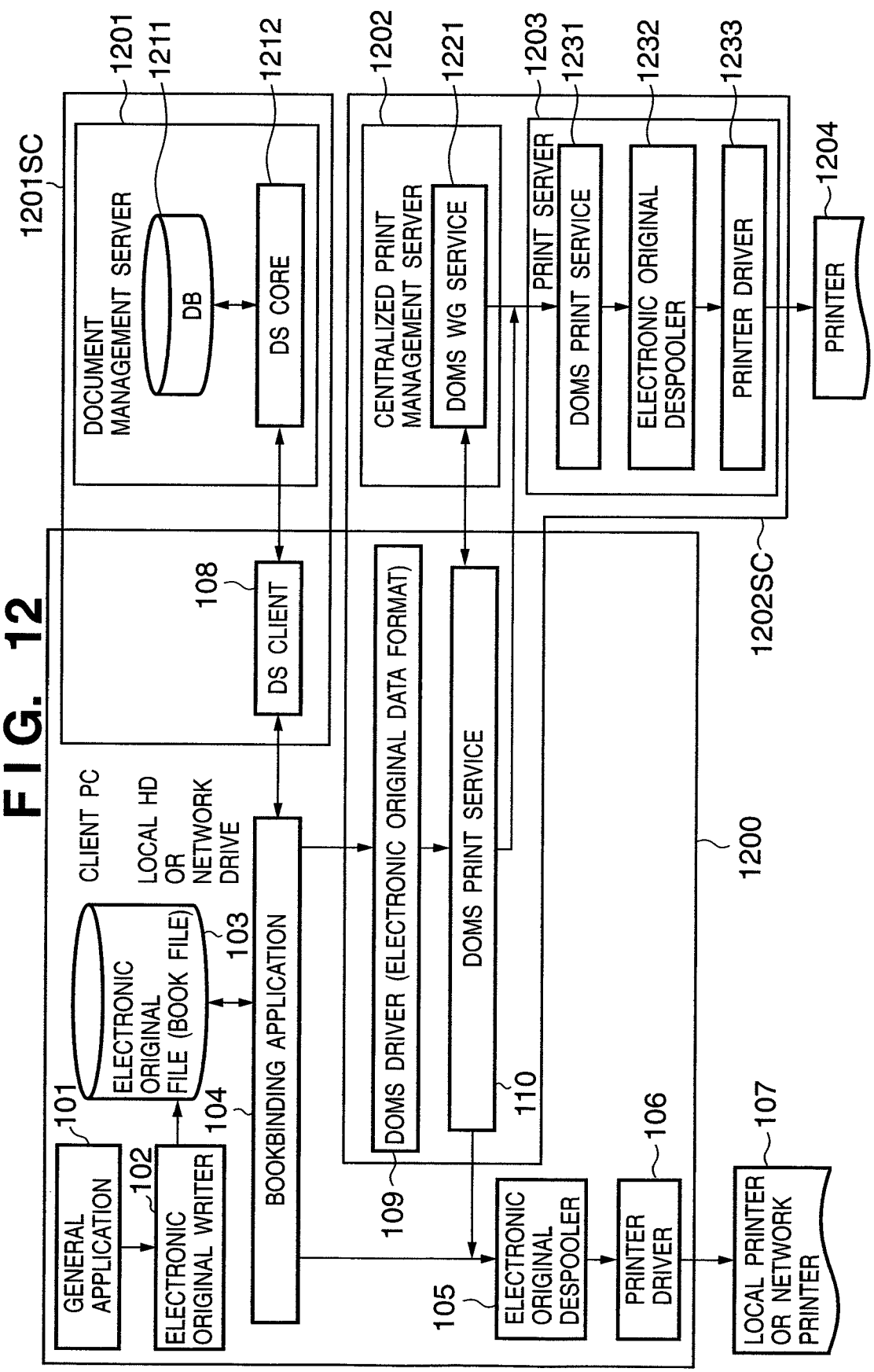
FIG. 12 is a block diagram showing a client-server document processing system.

FIG. 12 is a block diagram showing the arrangement of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, centralized print management server 1202, and print server 1203. These servers are generally connected to the client document processing system via a network. When the servers also function as clients, they are connected by interprocess communication which simulates communication between networks. The document management server 1201 and centralized print management server 1202 are connected to the client in FIG. 12, but only either one may exist on the network. If the connected server is the document management server, a document management server-client system 1201SC including a client module is added to the stand-alone document management system. If the connected server is the centralized print management server 1202, a print management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized print management server 1202 manages printing of a book file stored in the client document processing system 1200 or document management server 1201. A print request from the client is transmitted to a DOMS WG server module 1221 of the centralized print management server 1202 via the DOMS driver 109 and DOMS print service module 110. To print a book file by the printer of the client, the centralized print management server 1202 transfers electronic original data to the electronic original despooler 105 via the DOMS print service module 110 of the client. To print a book file by the print server 1203, the centralized print management server 1202 transmits electronic original data to a DOMS print service module 1231 of the print server 1203. For example, the centralized print management server 1202 executes security check on the qualification of a user who has issued a print request for a saved book file, and saves the print processing log. In this fashion, the document processing system can be implemented as both a stand-alone system and client-server system.

<Contents of Preview Display>

As described above, when the bookbinding application 104 opens a book file, the user interface window 1100 shown in FIG. 10 is displayed. The tree portion 1101 displays a tree representing the structure of the opened book (to be referred to as a "book of interest" hereinafter). At the preview portion, three display methods are prepared in accordance with designation by the user. The first display method is an original view mode in which an original page is directly displayed. In the original view mode, the contents of an original page belonging to the book of interest are reduced and displayed. The display at the preview portion does not reflect the layout. The second display method is a print view mode. In the print view mode, the preview portion 1102 displays an original page which reflects the layout of the original page so as to display a print result based on a selected print function (to be described later). The third display method is a simple print view mode. In the simple print view mode, the display at the preview portion reflects not the contents of each original page but only the layout.

Print setting processing operation by the bookbinding application 104 will be explained.

The bookbinding application 104 can perform print settings within functions usable by a specific printing apparatus, or can freely perform print settings regardless of the functions of a specific printing apparatus. The former processing will be called a limited-function mode; and the latter processing, an unlimited-function mode. To create a document on the assumption that the document is to be printed by a specific printer usable in the document creation environment, the document author creates a document in the limited-function mode, and can perform print settings for the document as far as this setting can be realized by the specific printer. To create a document on the assumption that the document is to be printed by a printer absent in the document creation environment or that the printer to be used is not limited, the document author creates a document in the unlimited-function mode, and can perform print settings using an advanced function for the document even in the environment where no high-end printer exists.

To create a new document by the bookbinding application 104, a "new document" dialog shown in FIG. 13 is displayed by, e.g., selecting a "new document" from the file menu.

A "printer name" drop-down list in the "new document" dialog displays a list of printers usable in the current environment. A printer to be used for printing is selected from this list. If a document is created without assuming printing by printers included in the list, any printer can be selected.

In "function list", a list of functions of the printer designated in "printer name" is displayed in a region 1301. If the selected printer in "printer name" is changed, the display of "function list" is also changed in accordance with the printer. The document author can refer to the display contents of "function list" and select a printer which can realize document settings to be created.

As described above, the OS recognizes basic functions out of printer functions. Some OSs can acquire the basic function performance of an output destination printer from an application. For example, the Windows OS allows acquiring the performance, acquiring setting values, and setting the values between the application, the OS, and the printer driver for functions such as the number of copies, double-sided printing, paper size, and resolution.

The print control system of this embodiment can acquire the performance, acquire setting values, and set the values not only for basic functions recognized by the OS but also for printer functions such as staple, saddle stitch, and Z-fold functions not generally recognized by the current OS. For example, the Windows OS does not recognize these functions, and in general, acquisition of the performance, and acquisition and setting of setting values cannot be performed between the application, the OS, and the printer driver.

FIGS. 14A and 14B show examples of function information acquired from the printer driver 106 by the application 104. When the application 104 inquires a controllable function of the printer driver 106, the printer driver 106 sends back an ID list of controllable functions as shown in FIGS. 14A and 14B. In the example of a high-end apparatus shown in FIG. 14A, the printer driver replies that the printer can control double-sided printing, output paper size, staple, punch, Z-fold, and saddle stitch. In the example of a low-end apparatus shown in FIG. 14B, the controllable function is only the output paper size. Since the printer driver is dedicated to a specific printer, the printer driver incorporates information about whether respective functions can be controlled. The printer driver sends back this information in response to an inquiry from the application 104.

As for the listed functions, the application 104 can acquire from the printer driver 106 the current setting value, change of the setting value, the range of setting values, or a list of settable options.

If a "limit print format in accordance with function of selected printer model" check box 1301 in FIG. 13 is checked, a limited-function mode in which printing is set within the functions of a printer designated in the "printer name" drop-down list can be designated. If the check box 1301 is canceled, a unlimited-function mode in which printing is set regardless of the functions of a specific printing apparatus can be designated.

In "format template", the definitions of format templates each as a combination of the setting values of a plurality of setting items are prepared. A template icon in a left region 1303 is selected, and then setting values included in the selected template are displayed in a right region 1304. FIGS. 15A and 15B show examples of the contents of templates. The contents of template 1 in FIG. 15A are double-sided printing, stapling at an upper left portion (one portion), and Z-fold. The contents of template 2 in FIG. 15B are bookbinding printing, saddle stitch, and a binding margin of 10 mm at the binding center. Note that bookbinding printing means an output format in which two pages are imposed on each surface of a paper sheet and all print results are folded into two at the center into a book shape. Setting items saved in the template are defined in advance, but not all the items are always valid. For example, the setting values of the bookbinding margin and saddle stitch are significant only when the setting values of the printing method represent bookbinding printing. In bookbinding printing, the setting values of the staple and binding direction are insignificant. From this, items displayed in the right region of "format template" change depending on the template.

Figure 16:
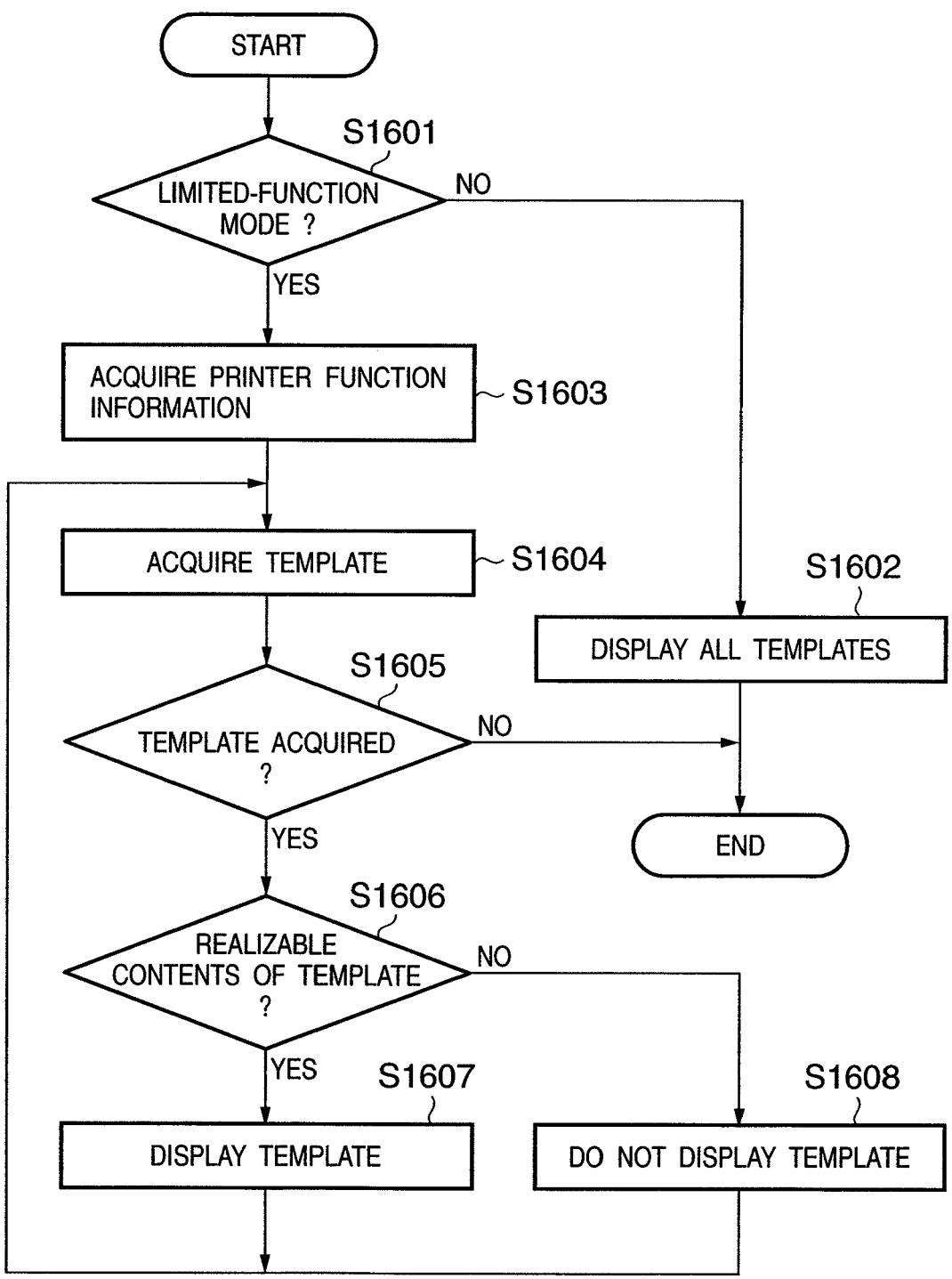
FIG. 16 is a flow chart showing template display processing according to the embodiment of the present invention.

FIG. 16 shows the flow chart of template display processing. Template display processing will be described with reference to FIGS. 13 and 16.

In step S1601, the state of the check box 1301 shown in FIG. 13, i.e., whether the mode is the limited-function mode or unlimited-function mode is checked. If the mode is the unlimited-function mode, the icons of all templates are displayed in the region 1303 in step S1602. The document author can select an arbitrary one of the displayed templates.

If the mode is the limited-function mode, function information as shown in FIG. 14A or 14B is acquired from the printer driver of a printer selected from the "printer name" drop-down list in step S1603. In step S1604, one of preset templates is acquired. In step S1605, whether all the templates have been acquired, i.e., whether display/non-display determination processing in step S1606 and subsequent steps ends for all the templates is checked. If YES in step S1605, i.e., if a template not having undergone determination processing is acquired, the flow advances to step S1606. In step S1606, whether the contents of the template acquired in step S1604 can be realized is checked based on the function information acquired in step S1603. If YES in step S1606, the template is displayed in step S1607; if NO, the template is not displayed in step S1608. If NO in step S1605, i.e., if any unprocessed template cannot be acquired in step S1604, template display processing ends.

In the limited-function mode, a template which cannot be realized by the performance of a selected printer is not displayed, inhibiting the template from being selected.

If the paper orientation can be set by an arbitrary printer, this setting included in the template need not be determined using function information. If the page layout is set independently of the printer function, this setting need not be determined using function information, either. On this assumption, for example, template 1 shown in FIG. 15A is determined to have the following conditions and be realizable by a printer.

All pieces of function information such as double-sided printing, output paper size, staple, and Z-fold can be acquired from the printer driver.

"Letter" is included in acquiring options settable as the output paper size.

Only templates which meet these conditions are displayed in the "format template" region 1303. When the check box 1301 is checked, settings realizable by a printer selected in the "printer name" drop-down list can be designated by selecting an arbitrary one of displayed templates.

FIG. 17 shows the "detailed settings of document" window of the application 104. This window is activated from, e.g., the "detailed settings of document" menu of the editing menu on the application operation window in FIG. 10. The "detailed settings of document" window is for setting attributes which affects the entire document. The "detailed settings of document" window is constituted by four sheets "page settings", "finishing", "edit", and "paper feed". FIG. 17 shows a state in which the "finishing" sheet is displayed.

Figure 18:
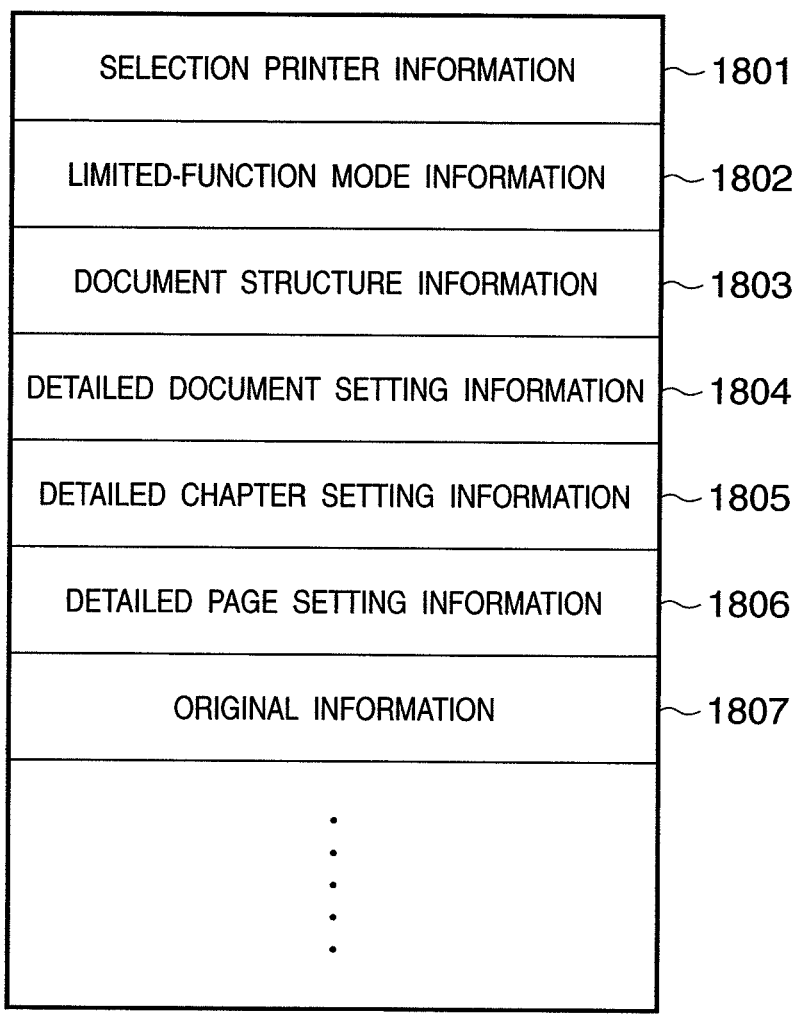
FIG. 18 is a view showing the data structure of a document file according to the embodiment of the present invention.

FIG. 18 shows the data structure of a document file processed by the application 104.

As selection printer information in a field 1801, information for identifying a printer selected by "printer name" of the "new document" dialog in FIG. 13 is stored. As will be described later, selection printer information can be changed in a "select printer" dialog or "print" dialog.

As limited-function mode information in a field 1802, information representing the limited-function mode or unlimited-function mode designated in the check box 1301 of the "new document" dialog is stored.

As document structure information in a field 1803, information about a document structure displayed on the tree view 1101 of the application operation window shown in FIG. 10 is recorded. As detailed document setting information in a field 1804, information set in the "detailed settings of document" window shown in FIG. 17 is recorded. A field 1805 for detailed chapter setting information and a field 1806 for detailed page setting information are regions for recording pieces of detailed setting information settable for each chapter and each page, and a description thereof will be omitted. As original information in a field 1807, drawing information of each original page is recorded. Pieces of information used for the preview display in the right region 1102 of FIG. 10 are saved in pages. A document file contains other information necessary for each document, and a description thereof will be omitted.

FIG. 19 shows detailed document setting information shown in the field 1804 of FIG. 18 in more detail. A field 1901 stores document page setting information; a field 1902, document finishing information; a field 1903, document editing information; and a field 1904, document paper feed information. These pieces of information coincide with contents set on the "page settings", "finishing", "edit", and "paper feed" sheets of the "detailed settings of document" window shown in FIG. 17.

FIG. 20 shows document finishing information shown in the preview portion 1902 of FIG. 19 in more detail. A field 2001 stores a printing method; a field 2002, a binding direction; a field 2003, a binding width; a field 2004, original adjustment; a field 2005, staple designation; a field 2006, a staple position; a field 2007, a punch hole; a field 2008, the presence/absence of Z-fold; a field 2009, a chapter break; and a field 2010, other setting values. These pieces of information coincide with contents set on the "finishing" sheet of the "detailed settings of document" window shown in FIG. 17. The field 2010 contains settings (not shown: for example, settings such as saddle stitch and center binding margin which become valid only in bookbinding printing) necessary when bookbinding printing is designated as the printing method 2001, a description of which will be omitted.

Figure 21:
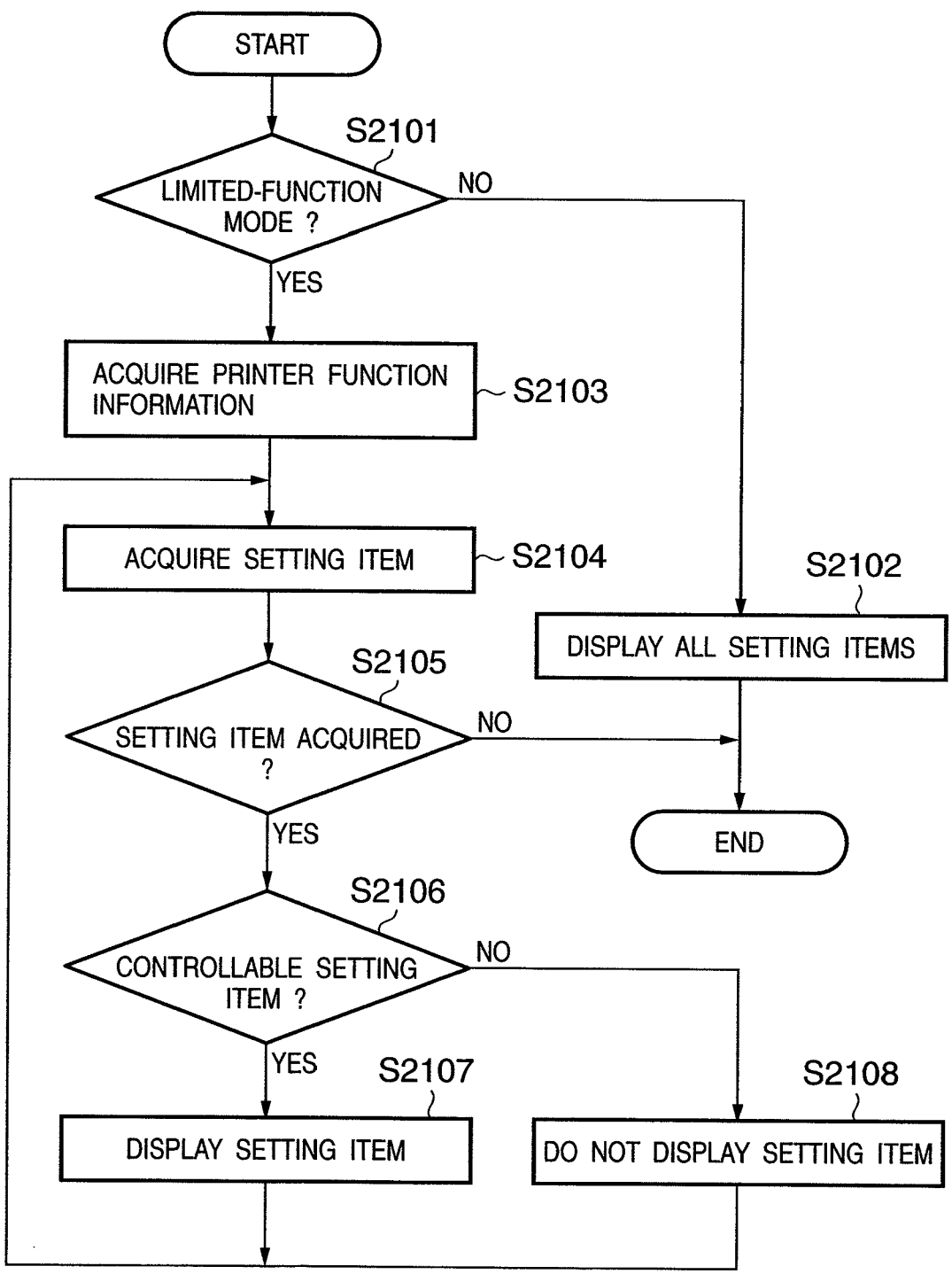
FIG. 21 is a flow chart showing display processing of the "detailed settings of document" window in FIG. 17 according to the embodiment of the present invention.

FIG. 21 shows the flow chart of display processing of "detailed settings of document" window in FIG. 17.

In step S2101, whether limited-function mode information in the field 1802 of FIG. 18 represents the limited-function mode is checked. If NO in step S2101, the "detailed settings of document" window is displayed in step S2102 so as to enable editing all printer control items controllable by the application 104. For example, when a printer (printer selected in "printer name" of FIG. 13) represented by selection printer information in the field 1801 can control only the function of a low-end apparatus in FIG. 14B, i.e., the printer cannot control double-sided printing, the "printing method" on the "finishing" sheet of the "detailed settings of document" window is so displayed as to enable selecting not only single-sided printing but also double-sided printing and bookbinding printing. Similarly, for a printer which cannot control the staple, punch, Z-fold, and the like, the "detailed settings of document" window is so displayed as to enable setting these items.

If YES in step S2101, function information of a printer represented by selection printer information in the field 1801 is acquired from the printer driver of the printer in step S2103. In step S2104, one of setting items held by the application 104 in advance is acquired. In step S2105, whether all the setting items have been acquired, i.e., whether display/non-display determination processing in step S2106 and subsequent steps ends for all the setting items is checked. If YES in step S2105, i.e., if a setting item not having undergone determination processing is acquired, the flow shifts to step S2106. In step S2106, whether the setting item acquired in step S2104 can be controlled by the printer is checked based on the function information acquired in step S2103. If YES in step S2106, the setting item is displayed in step S2107; if NO, the control item is not displayed in step S2108. If NO in step S2105, i.e., if any unprocessed setting item cannot be acquired in step S2104, "detailed settings of document" window display processing ends.

Figure 22:
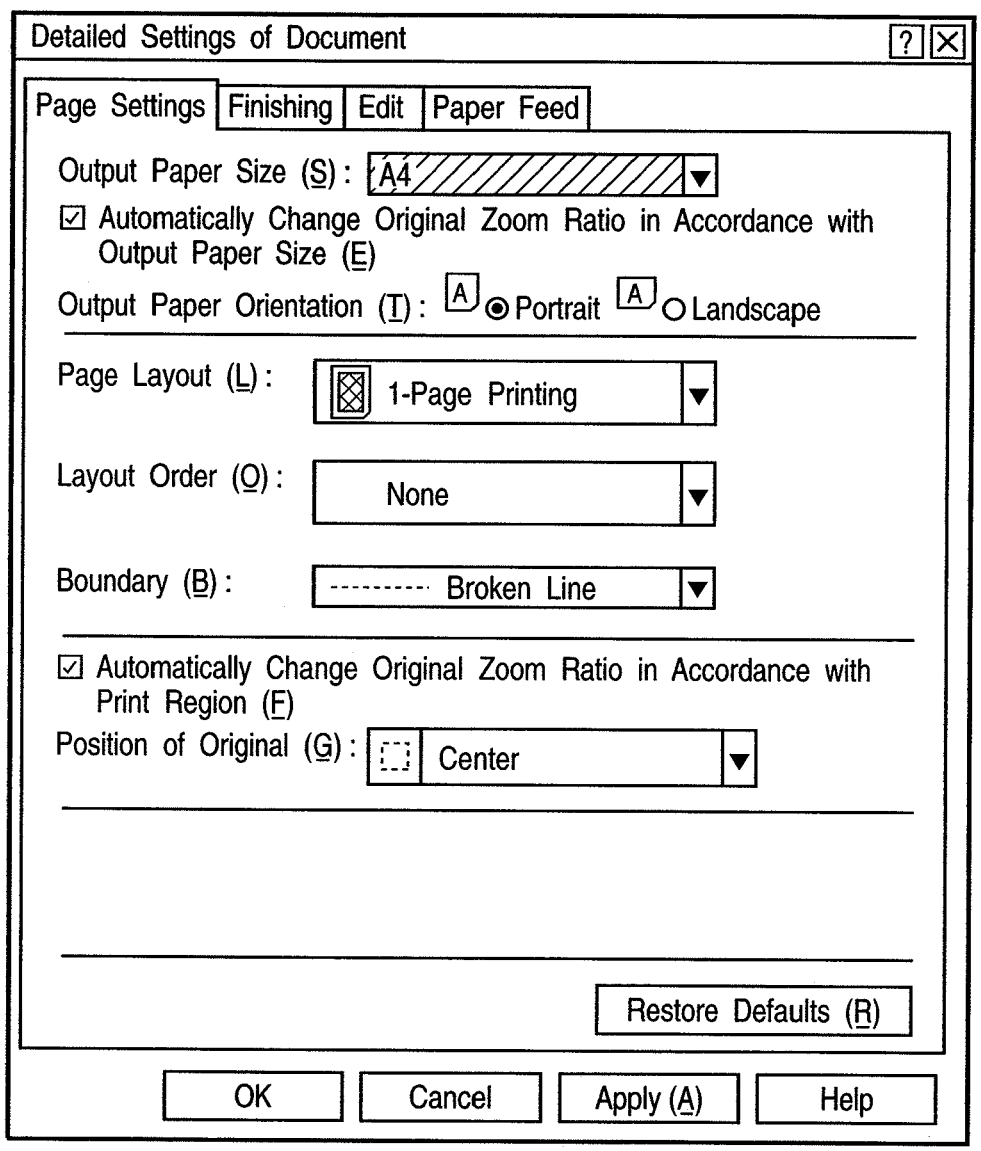
FIG. 22 is a view showing a "page setting sheet" display in a limited-function mode according to the embodiment of the present invention.
Figure 23:
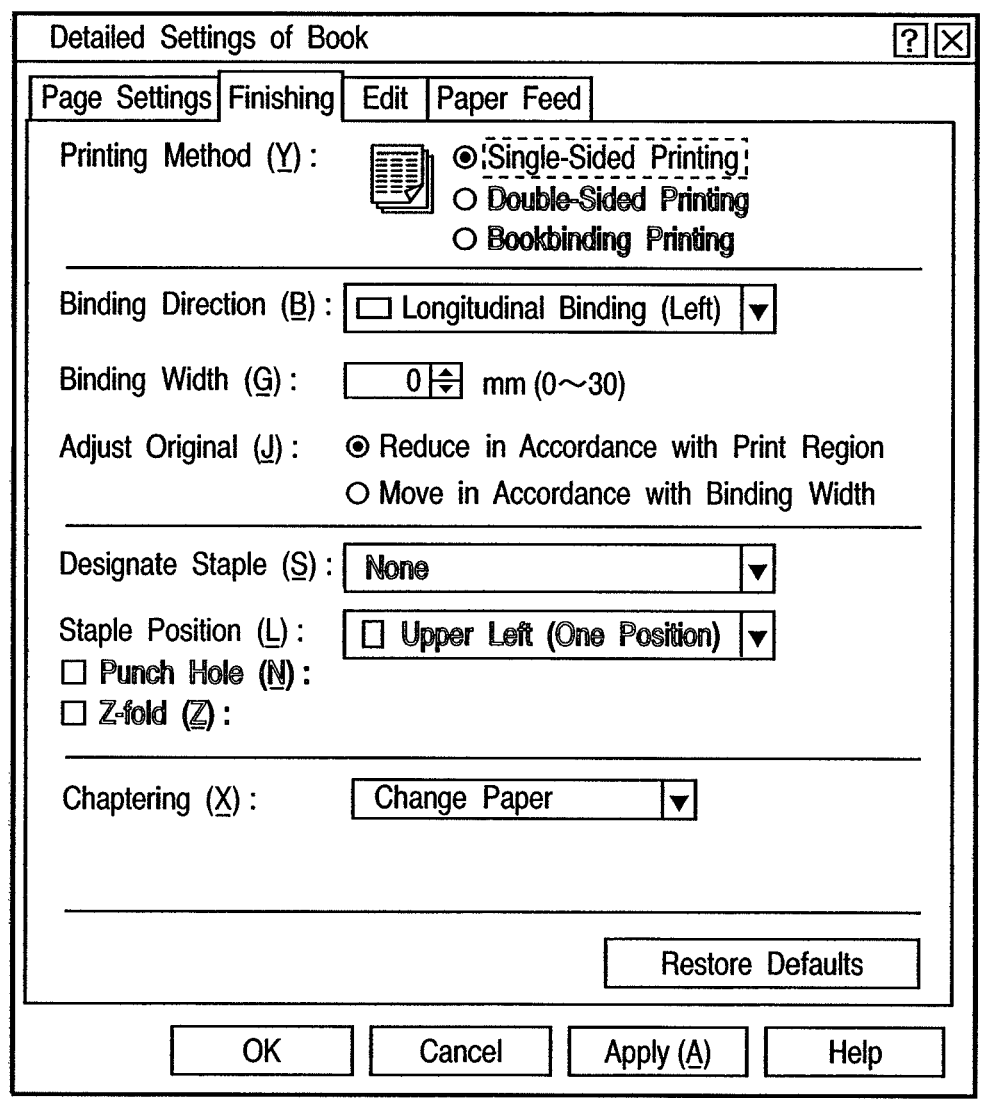
FIG. 23 is a view showing a "finishing sheet" display in the limited-function mode according to the embodiment of the present invention.

Note that items settable by an arbitrary printer need not be determined using function information. Further, a setting item independent of the printer function need not be determined using function information, either. On this assumption, the "page settings" sheet of the "detailed settings of document" window is displayed without any restrictions as shown in FIG. 22 even for a low-end printer having the function shown in FIG. 14B. As shown in FIG. 23, the "finishing" sheet displays the printing method so as to enable selecting only single-sided printing and inhibit designation of the staple, punch, Z-fold, and the like.

In this way, only setting items controllable by the printer are displayed, and uncontrollable setting items are not displayed. Even in the limited-function mode, only settings realizable by a selected printer can be designated by setting arbitrary ones of the displayed setting items.

Figure 24:
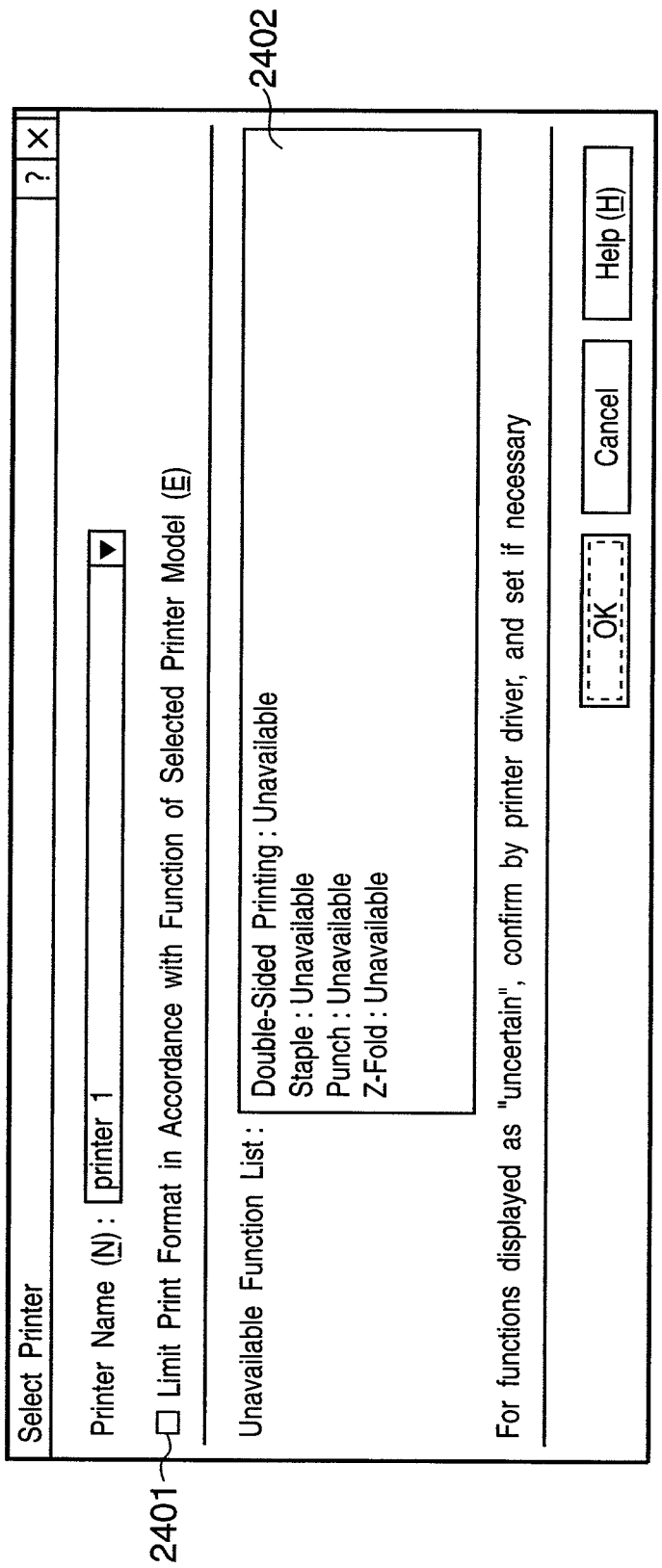
FIG. 24 is a view showing a "select printer" window according to the embodiment of the present invention.

FIG. 24 shows the "select printer" window of the application 104. This window is activated from, e.g., the "select printer" menu of the file menu on the application operation window in FIG. 10. The "select printer" window is used to change the settings of an output designation printer and limited-function mode designated on the "new document" window in creating a document. The "printer name" drop-down list shows a currently selected printer, which can be changed. Similar to the "new document" dialog, the limited-function mode/unlimited-function mode is designated on a "limit print format in accordance with function of selected printer model" check box 2401. If the check box 2401 is not checked, functions not supported by a selected printer, i.e., functions which are used in creating a document but cannot be used by a selected printer are displayed in a region 2402.

Figure 25:
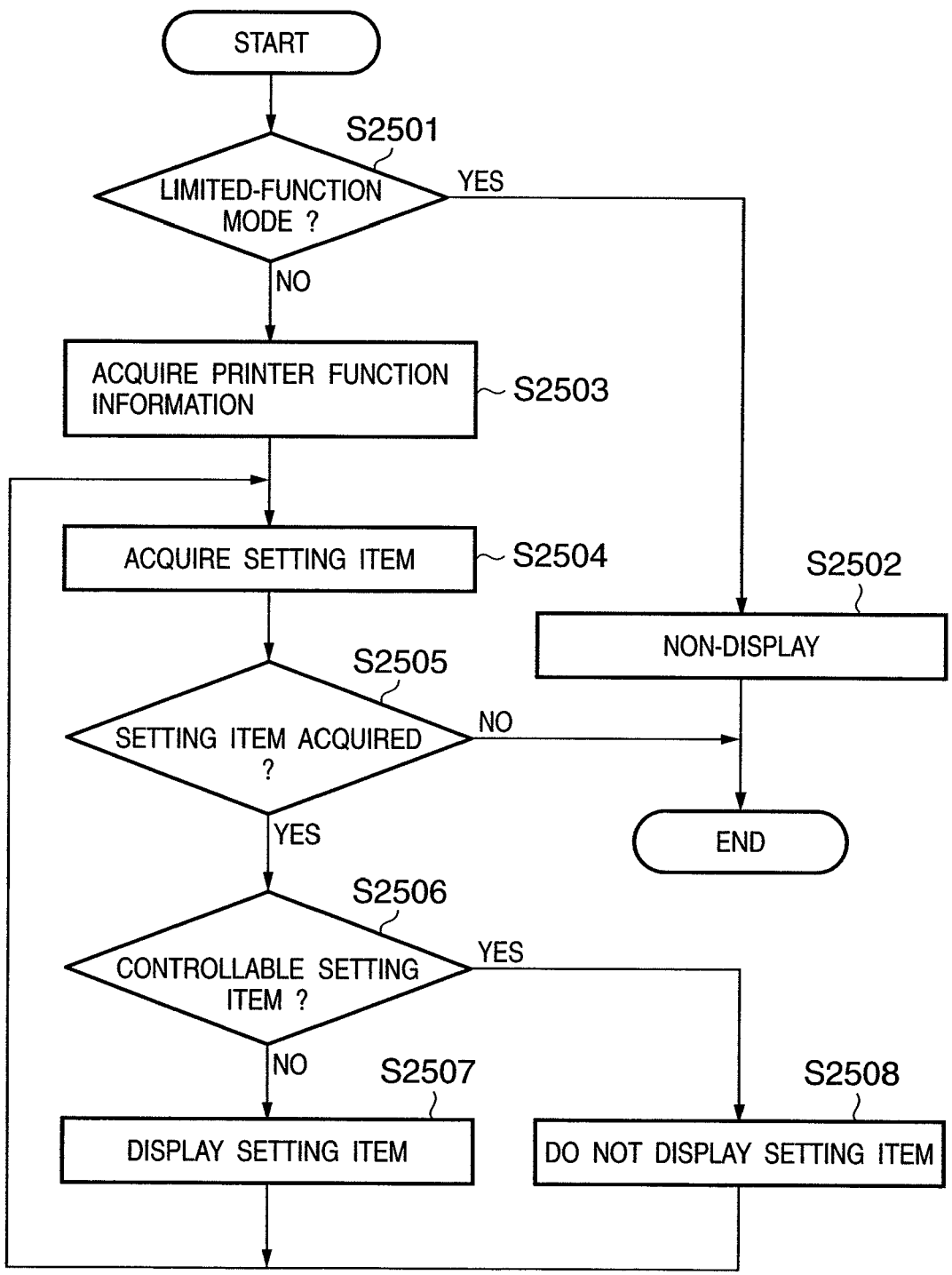
FIG. 25 is a flow chart showing "unavailable function list" display processing of the "select printer" window according to the embodiment of the present invention.

FIG. 25 shows a display processing flow for an unavailable function list in the region 2402 of the "select printer" window.

In step S2501, whether limited-function mode information in the field 1802 of FIG. 18 represents the limited-function mode is checked. If YES in step S2501, processing of displaying no function on the "unavailable function list" is performed in step S2502. This is because, when a document is edited in the limited-function mode, uncontrollable functions of a selected printer cannot be set, as described in "detailed settings of document" window display processing.

If NO in step S2501, function information of a printer represented by selection printer information in the field 1801 is acquired from the printer driver of the printer in step S2503. In step S2504, one of setting items held by the application 104 in advance is acquired. In step S2505, whether all the setting items have been acquired, i.e., whether display/non-display determination processing in step S2506 and subsequent steps ends for all the setting items is checked. If YES in step S2505, i.e., if an unprocessed setting item is acquired, the flow shifts to step S2506. In step S2506, whether the setting item acquired in step S2504 can be controlled by the printer is checked based on the function information acquired in step S2503. If NO in step S2506, the setting item is displayed in step S2507; if YES, the control item is not displayed in step S2508. If NO in step S2505, i.e., if any unprocessed setting item cannot be acquired in step S2504, "unavailable function list" window display processing ends.

Note that items settable by an arbitrary printer need not be determined using function information. A setting item independent of the printer function need not be determined using function information, either. Such a setting item is never displayed in the "unavailable function list".

In this fashion, when the check box 2401 is checked, functions which cannot be realized by a selected printer in the current function designation can be displayed in the "unavailable function list" region.

Figure 26:
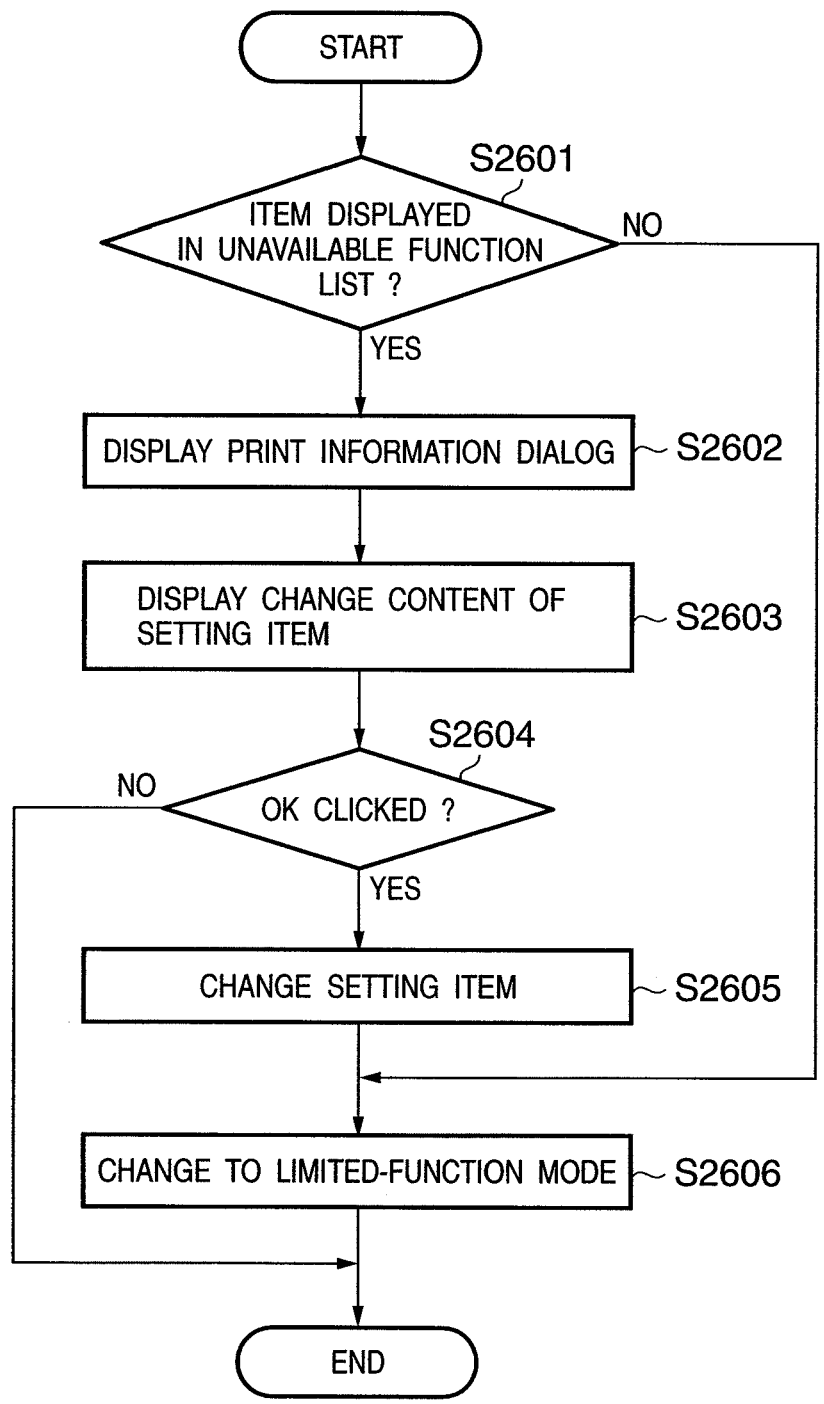
FIG. 26 is a flow chart showing processing when the unlimited-function mode is changed to the limited-function mode according to the embodiment of the present invention.

FIG. 26 shows processing when the check box 2401 in FIG. 24 is changed from "ON" to "OFF".

If the check box 2401 is checked, the contents of the "unavailable function list" are checked in step S2601. If no function is displayed, limited-function mode information in the field 1802 of FIG. 18 is changed from the unlimited-function mode to the limited-function mode in step S2606, and the processing ends.

If any unavailable function is displayed in the "unavailable function list" region 2402, a "printer information" dialog is displayed in step S2602. FIG. 27 shows an example of the "printer information" dialog.

In step S2603, change contents when setting items displayed in the "unavailable function list" are invalidated are displayed in the "printer information" dialog. In step S2604, the document author is caused to select whether to change the contents. If the document author selects "OK", i.e., to change the contents, the setting items are changed in step S2605, the unlimited-function mode is changed to the limited-function mode in step S2606, and the processing ends. If the document author selects "cancel", i.e., not to change the contents, the processing ends in the unlimited-function mode.

Hence, the limited- and unlimited-function modes can be switched during editing of a document. If setting items must be changed to switch the mode, the document author can be notified of the contents in advance.

Figure 28:
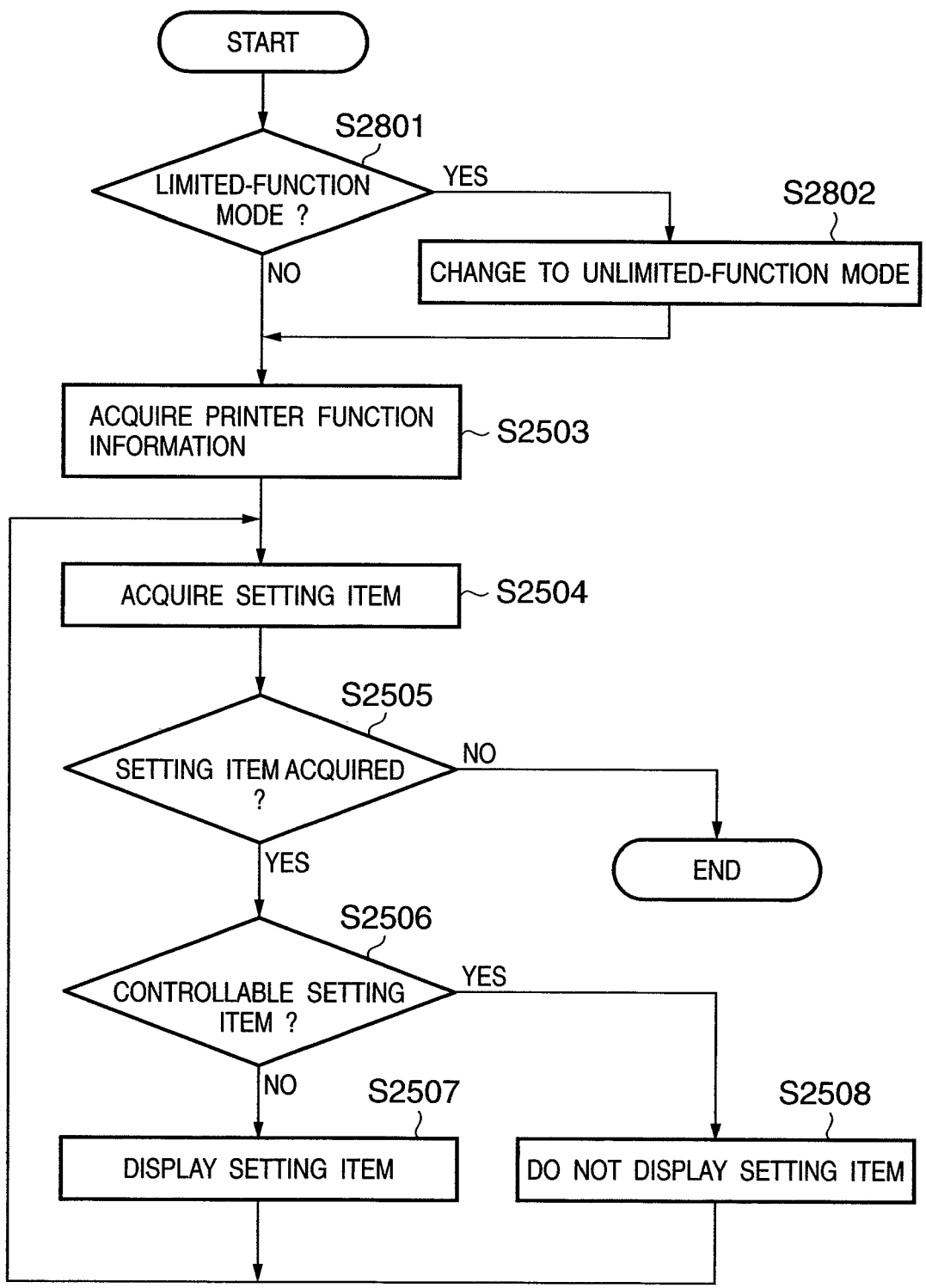
FIG. 28 is a flow chart showing processing when the printer is changed according to the embodiment of the present invention.

FIG. 28 is a flow chart showing processing when the printer is changed in the "printer name" drop-down list shown in FIG. 24.

In step S2801, limited-function mode information is checked, and if the limited-function mode is set, the mode is changed to the unlimited-function mode in step S2802. Hence, even when the current setting items cannot be controlled by a changed printer, edited contents can be maintained without invalidating the set contents. Processes in step S2803 and subsequent steps are the same as those in the display processing flow of the "unavailable function list" of the "printer function" window shown in FIG. 25. The same step numbers denote the same processes, and a description thereof will be omitted.

Figure 29:
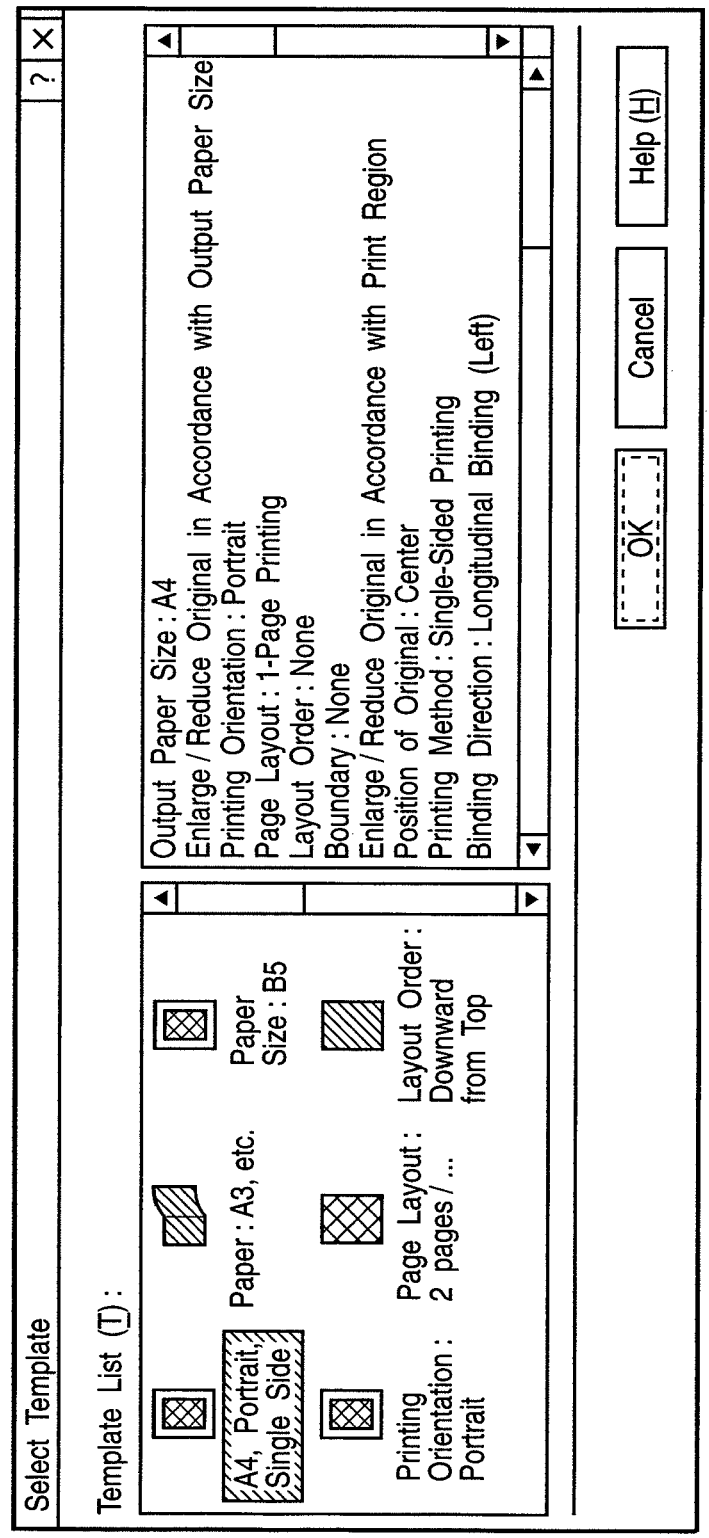
FIG. 29 is a view showing a "select template" dialog according to the embodiment of the present invention.

FIG. 29 shows a "select template" dialog. This dialog is activated from, e.g., the "select template" menu of the print format menu on the application operation window in FIG. 10.

In this dialog, a template can be changed and designated for a document during editing. As templates displayed in the template list, only templates applicable to a document during editing regardless of the limited-or unlimited-function modes can be displayed by the same processing as the template display processing flow of the "new document" dialog shown in FIG. 16.

FIG. 30 shows a "print" dialog.

This dialog is activated from, e.g., the "print" menu of the file menu on the application operation window in FIG. 10.

This dialog displays designation of an output destination printer, switching between the limited-function mode and the unlimited-function mode, and a list of functions unavailable in the unlimited mode. The processing flow is the same as the processing flow of the "select printer" dialog, and a description thereof will be omitted. This dialog allows outputting an instruction generated for a specific printing apparatus to another printing apparatus.

If the "OK" button is clicked on the "print" dialog in FIG. 30, various settings set for a selected printer are designated based on the data contents of a document file shown in FIG. 18. A drawing instruction is issued on the basis of the original information 1807 to obtain a desired print result.

In this description of the flow chart, to perform "non-display" processing, items determined to be "not displayed" suffice to be discriminated from items determined to be "displayed", and may be displayed. For example, as shown in the figure of each dialog window, items determined to be "displayed" are displayed dark, and items determined to be "not displayed" are displayed light. Alternatively, these items may be displayed in different colors. In this way, various display methods are conceivable. It is also possible to control not to display all or some of items determined to be "not displayed".

The present invention can be applied to a system constituted by a plurality of devices or an apparatus formed from one device.

As described above, according to the above embodiment, an instruction generated for a specific printing apparatus can be output to another printing apparatus. In an environment where no final output printing apparatus exists, an instruction for outputting a document from an arbitrary apparatus can be generated.

Further, the instruction operator can be notified of an impossible instruction in advance when an instruction generated for a specific printing apparatus is used for printing by another printing apparatus, or when an instruction for outputting a document from an arbitrary printing apparatus is generated in the environment where no final output printing apparatus exists.

When there is provided a method of designating a template which defines a combination of a plurality of instructions, and issuing the instructions at once, a template can be selected from templates each comprised of instructions realizable by an output destination printing apparatus. Alternatively, the instruction operator can be notified in advance of an impossible instruction out of instructions included in a designated template.

The present invention can provide an information processing apparatus and method which enable creating and editing a document made up of data created by user-desired application programs, and increase the operability and document editing productivity.

A document can be edited in accordance with the functions of an arbitrary printing apparatus or without any restrictions on the functions of the printing apparatus regardless of the presence/absence of information about a printing apparatus which finally prints a document.

Proper settings can be reliably performed when a document is edited in accordance with the functions of a specific printing apparatus.

In addition, proper print settings can be performed when a document which is edited in accordance with the functions of an arbitrary printing apparatus or without any restrictions on the functions of the printing apparatus is actually printed by a printing apparatus having different functions.

The present invention is not limited to the above embodiments and various changes and modifications can be made within the spirit and scope of the present invention. Therefore to apprise the public of the scope of the present invention, the following claims are made.

What is claimed is:

1. An information processing apparatus, comprising:
   a display unit configured to display a plurality of icons respectively representing a plurality of templates, each of the templates comprising a plurality of print setting values corresponding to printer functions;
   a selection unit configured to select a limited-function mode or an unlimited-function mode;
   a screen-display unit configured to display a screen enabling the designation of a print range in terms of page or record number(s) as a variable printing; and
   a control unit configured to,
      in a case where the limited-function mode is selected, control said display unit to display a first subset of the icons that correspond(s) to first template(s) which do(es) not include a print setting value which cannot be realized by the selected printing apparatus and not to display a second subset of the icons that correspond(s) to second template(s) comprising at least one print setting value which cannot be realized by the selected printing apparatus, and
      in a case where the unlimited-function mode is selected, control said display unit to display both the first and second subsets of icons.

2. The apparatus according to claim 1, further comprising an acquisition unit configured to acquire function information of the selected printing apparatus,
   wherein the function information indicates a function/functions that can be realized by the selected printing apparatus, and is obtained from the selected printing apparatus.

3. An information processing method performed in an information processing apparatus, comprising:
   a displaying step of displaying, by a display unit, a plurality of icons respectively corresponding to a plurality of templates, each of the templates comprising a plurality of print setting values corresponding to printer functions;
   a selection step of selecting a limited-function mode or an unlimited-function mode;
   a screen-display step of displaying a screen enabling to designate a print range in terms of page or record number(s) as a variable printing; and
   a controlling step of controlling,
      in a case where the limited-function mode is selected, the display unit to display a first subset of the icons that correspond(s) to first template(s) which do(es) not include a print setting value which cannot be realized by the selected printing apparatus and not to display a second subset of the icons that correspond(s) to second template(s) comprising at least one print setting value which cannot be realized by the selected printing apparatus, and
      in a case where the unlimited-function mode is selected, the second display unit to display both the first and second subsets of icons.

4. The method according to claim 3, further comprising an acquisition step of acquiring function information of the selected printing apparatus,
   wherein the function information indicates a function/functions that can be realized by the selected printing apparatus, and is obtained from the selected printing apparatus.

5. A non-transitory readable storage medium storing, in executable form, a program causing an image processing apparatus to implement the information processing method according to claim 3.

* * * * *